United States Patent
Cohen et al.

(10) Patent No.: US 6,507,845 B1
(45) Date of Patent: Jan. 14, 2003

(54) METHOD AND SOFTWARE FOR SUPPORTING IMPROVED AWARENESS OF AND COLLABORATION AMONG USERS INVOLVED IN A TASK

(75) Inventors: Andrew L. Cohen, Brookline, MA (US); Bob Stachel, Arlington, MA (US); Steve Foley, Quincy, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/395,642

(22) Filed: Sep. 14, 1999

Related U.S. Application Data

(60) Provisional application No. 60/100,159, filed on Sep. 14, 1998.

(51) Int. Cl.[7] .............................................. G06F 17/30
(52) U.S. Cl. ............................. 707/100; 707/1; 707/3; 707/10; 707/104.1; 707/102
(58) Field of Search ........................ 707/513, 503–505, 707/102, 100, 104, 1, 3, 10, 104.1

(56) References Cited

U.S. PATENT DOCUMENTS

| | | |
|---|---|---|
| 5,008,853 A | 4/1991 | Bly et al. |
| 5,157,783 A | 10/1992 | Anderson et al. |
| 5,159,669 A | 10/1992 | Trigg et al. |
| 5,220,657 A | 6/1993 | Bly et al. |
| 5,333,256 A | 7/1994 | Green et al. |
| 5,408,662 A | 4/1995 | Katsurabayashi |
| 5,557,722 A | 9/1996 | DeRose et al. |
| 5,587,935 A | 12/1996 | Brooks et al. |
| 5,608,426 A | 3/1997 | Hestor |
| 5,613,134 A | 3/1997 | Lucus et al. |
| 5,615,336 A | 3/1997 | Robson et al. |
| 5,623,655 A | 4/1997 | Chisaka |
| 5,671,428 A | 9/1997 | Muranaga et al. |
| 5,708,806 A | 1/1998 | DeRose et al. |
| 5,715,461 A | 2/1998 | Yoshitomi |
| 5,745,687 A | 4/1998 | Randell |
| 5,781,732 A | 7/1998 | Adams |
| 5,799,320 A | 8/1998 | Klug |
| 5,806,079 A | 9/1998 | Rivette et al. |
| 5,813,006 A * | 9/1998 | Polnerow et al. .............. 707/10 |
| 5,835,713 A | 11/1998 | FitzPatrick et al. |
| 5,838,323 A | 11/1998 | Rose et al. |
| 5,845,301 A | 12/1998 | Rivette et al. |
| 5,848,271 A | 12/1998 | Caruso et al. |
| 5,848,409 A | 12/1998 | Ahn |
| 5,862,346 A | 1/1999 | Kley et al. |
| 5,867,164 A | 2/1999 | Bornstein et al. |
| 5,872,569 A | 2/1999 | Salgado et al. |
| 5,872,924 A | 2/1999 | Nakayama et al. |
| 5,884,035 A | 3/1999 | Butman et al. |
| 5,890,177 A | 3/1999 | Moody et al. |
| 5,893,074 A * | 4/1999 | Hughes et al. .................. 705/8 |
| 5,893,128 A | 4/1999 | Nauckhoff |
| 5,897,635 A | 4/1999 | Torres et al. |
| 5,923,848 A * | 7/1999 | Goodhand et al. ............. 707/10 |
| 5,950,214 A | 9/1999 | Rivette et al. |
| 5,960,173 A * | 9/1999 | Tang et al. .................. 707/100 |
| 5,978,836 A | 11/1999 | Ouchi |
| 5,999,911 A * | 12/1999 | Berg et al. ...................... 705/9 |
| 6,088,702 A * | 7/2000 | Plantz et al. ................. 707/103 |
| 6,101,481 A * | 8/2000 | Miller ............................ 705/9 |

* cited by examiner

*Primary Examiner*—Sanjiv Shah
*Assistant Examiner*—Camy Truong
(74) *Attorney, Agent, or Firm*—Brown Raysman Millstein Felder & Steiner LLP

(57) ABSTRACT

The present invention discloses methods for improving awareness of the status of a task, and for improving collaboration among users involved in a task. Methods are provided in which activity data is displayed simultaneously in two separate regions of a screen display. A first region can contain a list of users in association with an activity most recently performed by each user. A second region can contain a list of data objects in association with an activity most recently performed on each of the data objects. Collaboration tools can be accessible through the list of users or the list of data objects.

33 Claims, 27 Drawing Sheets

FIG. 16

METHOD AND SOFTWARE FOR SUPPORTING IMPROVED AWARENESS OF AND COLLABORATION AMONG USERS INVOLVED IN A TASK

Applicants hereby claim the benefit of U.S. provisional application No. 60/100,159, titled "System and Method for Awareness, Planning and Joint Attention in Collaborative Writing," filed Sep. 14, 1998, which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates to the field of collaborative computing. More particularly, the invention relates to software tools for improving collaborative working among a group of people working together on a project or task involving a defined set of documents.

Crafting a document or presentation involves interactions between many core participants, their assistants and administration staff. Their frequent discussions cover issues such as the language, design, content, shape of the argument and where to look for critical information. Co-authors depend on tacit knowledge about which people need to be involved in the process, and what the document needs to convey when completed. In addition, co-authors are usually good at understanding social context and organizing interactions among group members. Authors typically know what information should be included in a particular document, which people ought to be informed when changes are proposed, and which people ought to see the document before it is signed or presented.

To get all the right people involved in such an activity might seem to call for workflow support. However, the inventors believe that actual work in these settings does not map onto pre-established, sequential format typical of most workflow systems. Rather, software needs to shift the focus from workflow support to tools that explicitly represent some of the information collaborators need, and enable them to find, connect and collaborate with the right people at the right time—all while allowing the collaborators to work in their primary work environment. Furthermore, traditional workflow tools generally do not support simple one to four step workflows under user control.

Tools to support awareness and the availability of people and documents, ad hoc workflow, document history monitoring, and synchronous and asynchronous collaboration all are critical to successful collaboration on documents. Co-located collaborators already make use of informal awareness, planning, history monitoring, and synchronous and asynchronous collaboration, but do not have adequate integrated software to support these activities. Distributed collaborators have trouble with simple issues like assuring everyone has the same version of a document, let alone being able to collaborate flexibly while co-constructing documents. Support for these collaborative processes must enable an author to focus on the document itself, working within that application, while collaborating with others through tools easily accessible at the periphery.

Early research on document construction explored individual cognitive processes. Subsequent investigations described how co-authors subdivide the document construction process. More recently, new ethnographic techniques have been developed and employed to understand the practice of document retrieval and re-use in activities such as litigation. Technologies to support collaborations about the writing process, such as awareness of a collaborator's activities and roles, and technologies to support specific writing processes, have been developed. Some of these technologies are described in the following references, all of which are hereby incorporated by reference into this application in their entirety:

Baecker, R. M., Glass, G., Mitchell, A., and Posner, I. R. "SASSE: The Collaborative Editor", refereed videotape presented at the 1994 ACM Conference on Human Factors in Computing Systems, May 1994.

Blomberg, J., Suchman, L., Trigg, R. "Reflections on a Work-Oriented Design Project" Proceedings of the Participatory Design Conference (Chapel Hill, N.C., October 1994) ACM press 99–109.

Dourish, P., and Bellotti, V. "Awareness and Coordination in Shared Workspaces" Proceedings of CSCW '92, (Toronto, November 1992), ACM press. 107–114.

Ellis, C., Gibbs, S., and Rein, G. "Design and Use of a Group Editor". In Cockton (ed.), Engineering for Human-Computer Interaction", North-Holland, 1990.

Leland, M., Fish, R., and Kraut., R "Collaborative Document Production Using Quilt" Proceedings of CSCW '88, (Portland, September 1988).

Palfreyman, K., and Rodden, T. "A Protocol for User Awareness on the World Wide Web" Proceedings of CSCW 96, (Boston, November 1996), ACM press. 130–139.

Sharples and van der Geest. "The New Writing Environment: Writers at Work in a World of Technology." Springer-Verlag, London, 1997.

A group working on a document needs to control its membership while maintaining flexibility, allow members of a particular group to know whether their colleagues are on-line, determine those colleagues' status (for example, whether they are currently online and active or inactive), alert them to a personal message, and initiate collaboration on a document, through chats, phone calls and ad hoc workflows.

There is therefore a need for a comprehensive software tool that provides these various functions in an integrated manner.

SUMMARY OF THE INVENTION

It is an object of the present invention to solve some of the problems described above with existing collaboration tools and systems.

It is another object of the present invention to extend collaboration on documents to distributed teams.

It is another object of the present invention to allow users access to a comprehensive set of collaboration tools while working on a document.

It is another object of the present invention to improve awareness of activities of a group of authors working on a group of documents involved in a project or task.

The above and other objects are achieved by a method implemented on a computer and corresponding software tool stored on a computer readable medium such as a hard, floppy or optical disk or other conventional storage media for improving awareness of a status of a task. The method involves the step of storing a first set of data representing a plurality of users involved in the task and a second set of data representing a plurality of data objects such as documents or database files involved in the task. The two sets of data representing users and data objects may be generated by one of the users by selecting a group of users from among a larger group such as in a corporation, firm, or other organization, and selected a group of documents or other data objects from among a larger set of such objects stored in a central location.

The method further involves receiving task-related data representing activities performed by each of the plurality of users involved in the task on the plurality of data objects involved in the task. In some embodiments, this data about activities is received on a client computer used by one of the users in the set from a server. The server runs server software, such as LOTUS DOMINO available from Lotus Development Corp., which manages a set of documents, monitors and stores actions performed on the document, replicates and distributes documents as they are revised, and facilitates communication among clients. The server software thus monitors activities relating to data objects performed by clients and distributes the revised objects and data relating to the revisions to the clients.

In accordance with the invention, the method further involves displaying activity data in two separate windows or regions of a screen display simultaneously. A first region contains a list of the plurality of users in association with an activity performed by each of the users concurrently or most recently. The second region contains a list of the plurality of data objects in association with an activity performed upon each the plurality of data objects concurrently or most recently. These two windows thus provide comprehensive awareness of the current or most recent activities performed by the users in the group as well as the current or most recent activity performed upon each of the documents involved in the project or task.

In accordance with embodiments of the invention, the user accessing these two windows may also access an application program on the client computer to review and manipulate one or more of the documents involved in the project. In addition, some embodiments provide integration of the twin windows and application program with additional collaborative tools, such as chat, document sharing, document history, electronic notes, email, etc.

As a result, the present invention provides a people and document centered awareness tool which serves as a entree into a comprehensive suite of collaborative tools for easy and effective collaboration on a project.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Preferred embodiments of the present invention are now described with reference to the drawings in the figures.

Figure 1:
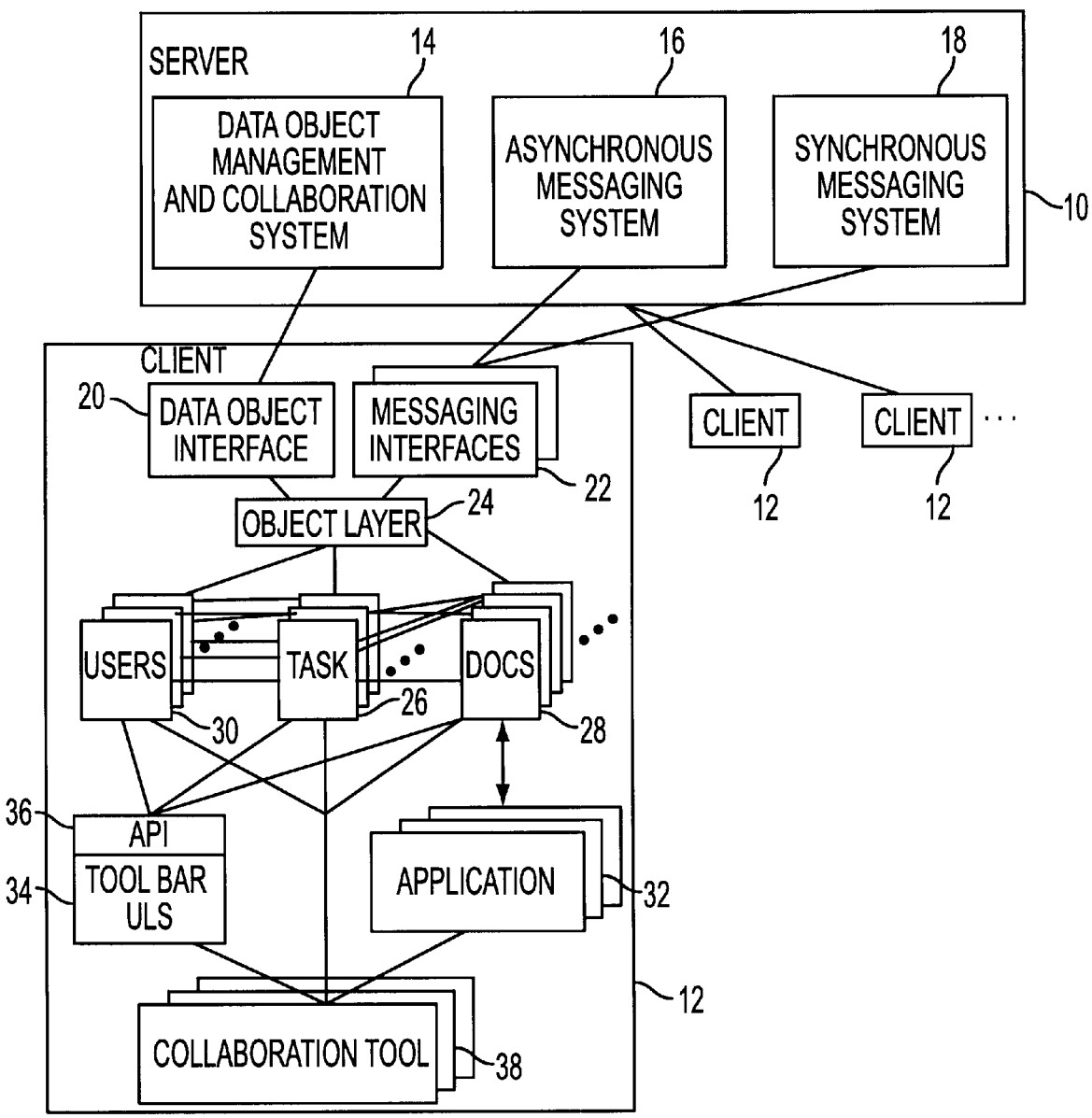
FIG. 1 is a block diagram showing a client-server system for improving collaboration among a number of users in accordance with one embodiment of the present invention.

As shown in FIG. 1, one embodiment of a system according to the present invention includes a server 10 connected to a number of clients 12 such as by intranet, extranet, wide area network, the Internet, etc. The server 10 and clients 12 contain hardware and software elements. The hardware elements are conventional general purpose computers including processors, volatile and nonvolatile memory devices, and input and output devices. The server 10 and clients 12 contain standard software elements such as a BIOS, operating systems, and client/server communication software.

The server 10 further contains a data object management and collaboration system 14 which performs document management and versioning, supports ad hoc workflow, and performs application synchronization and document event propagation and replication. The data object management system 14 further provides community co-presence functions such as described in commonly owned U.S. Pat. Nos. 5,864,874 and 5,819,084, both of which patents are hereby incorporated into this application in their entirety. The server 10 further contains two or more messaging systems, one system 16 for supporting asynchronous messaging, such as email or electronic notes, and at least one other system 18 for supporting synchronous messaging such as chats. As those of skill in the art will recognize, these various functions performed by the systems 14, 16, and 18 identified in FIG. 1 may be performed by a single system or more, separate systems.

Clients 12, of which only one is shown in detail in FIG. 1, contain a data object interface for interfacing with the object management system 14, one or more messaging interfaces 22 for interfacing with the server-side messaging systems 16, 18, and an object layer 24, an abstraction layer made up of objects that construct a model for supporting the collaborative environment described herein, which receives and send messages to the interfaces 20, 22. The clients 12 further contain three primary object types supported by the object layer 24—tasks or projects 26, documents 28, and user profiles 30. The document objects 28 contain application data as well as meta-data provided by the object management system 14 to clients, such as information tracking the history of the document. The user profiles 30 are sets of usernames and related information regarding users who have access to the system. The tasks 26 define separate tasks which each relate a number of user profiles 30 which have been selected to be involved in the task by one of the users with a number of the documents 28 which have been selected to be involved in the task by one of the users. The tasks 26 are implemented as lookup tables, indexes, or lists of pointers to the documents 28 and user profiles 30, or may be implemented in other similar fashion known to those of skill in the art.

The documents 28 are accessible through various application programs 32 residing on and executable by the client 12. The application programs 32 may include any known software applications including word processors, spreadsheet programs, database management programs, accounting programs, etc. The tasks 26, documents 28 and user profiles 30 are accessible by a tool bar user interface program 34 through an application program interface 36. As described in greater detail below, the tool bar UI program 34 retrieves data from the task, document and user objects 26, 28, 30 to produce a unique user interface simultaneously displaying tool bars, one showing the status of users and the other status of documents. The clients 12 further contain a set of collaboration software tools 38 which interface with the applications 32 and tool bar UI 34 to allow users to select other users and documents in the displayed tool bars and to initiate collaborative work with other users or manipulation of documents. Exemplary collaboration tools 38 and their functionality are described in greater detail below.

Figure 2:
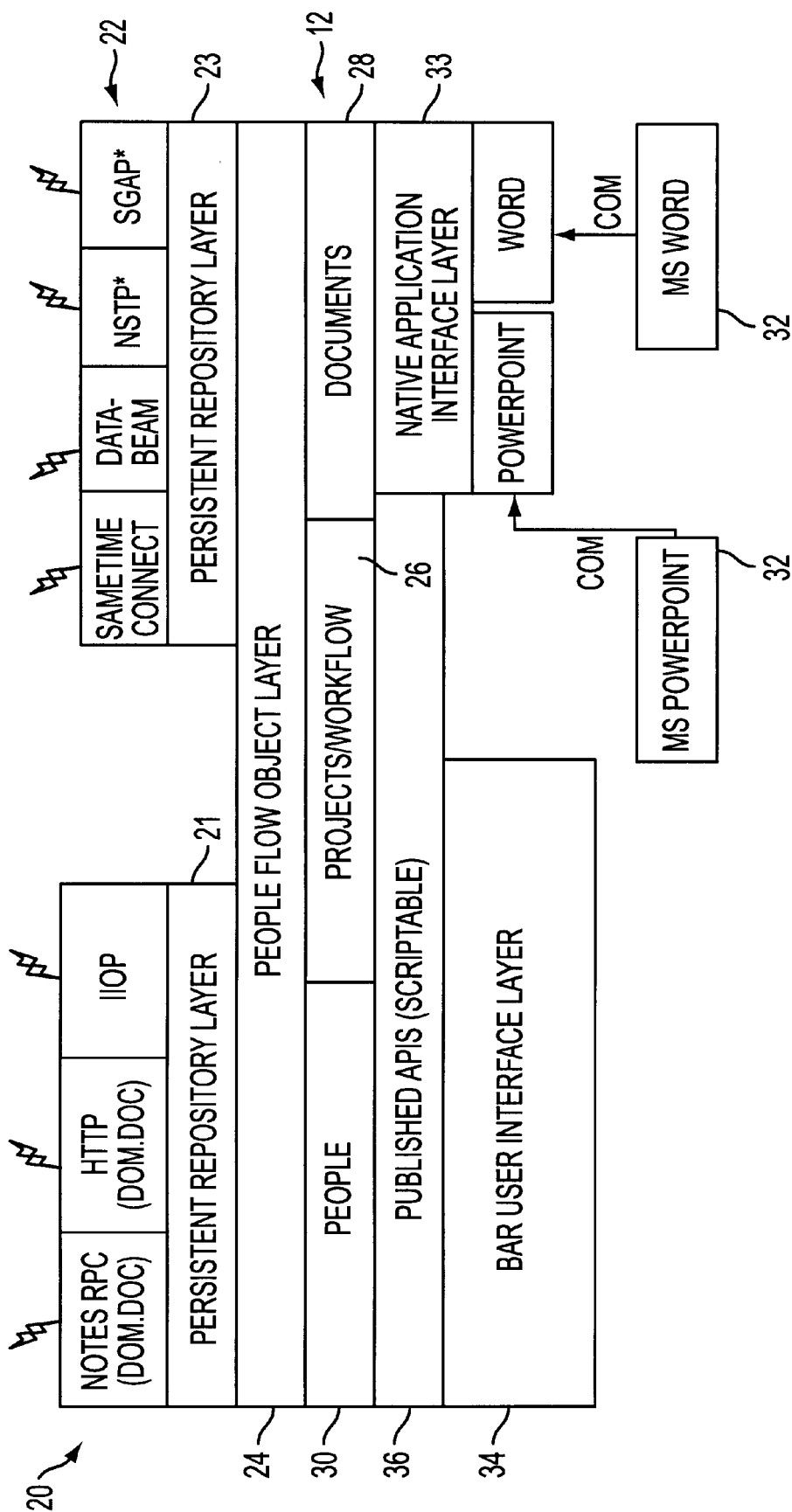
FIG. 2 is a block diagram showing an exemplary client as shown in FIG. 1 in accordance with one embodiment of the present invention.

An exemplary client 12 of one embodiment is shown in greater detail in FIG. 2. The client 12 shown in FIG. 2 is designed to operate with the NOTES or DOMINO document management systems available from Lotus Development Corp., as well as the Sametime and Notification Servers available from Lotus. The DOMINO system acts as the meta-data repository for the projects and provides the mechanism for managing documents and their versions. The DOMINO system also hosts agents and other server-side application support needed fore the ad hoc workflow features of the present invention, as described further below, and acts as the point through which the system-specific code integrates other servers to support integrated services for the clients 12.

The Sametime server is broken down into two components, a community server and a conference server. The Sametime community server provides the services for tracking the online status of collaborating colleagues and the conference server provides support for application sharing, both as described further below. The Notification server provides the services required for the propagation of document change events that occur during collaborations.

As shown in FIG. 2, the client 12 of one embodiment contains the tool bar user interface layer 34, which consists of objects representing the views of user and document status and which allows users to manipulate the objects, a published API 36 interfacing with the tool bar UI layer 34. The client further contains project objects 26, documents 28, and user or people profiles 30, and an object layer 24. The data object interface 20 in client 12 includes a persistent repository layer 21 which provides a uniform interface for interactions with the server 10 involving document storage and workflow. The Sametime communication layer 23 in the messaging interfaces 22 provides an interface into services for presence, sharing and workflow. The remaining interface components of the object interface 20 and messaging interface 22 interface with the server components corresponding with the names as shown, as known to those of skill in the art. The interface labeled SGAP refers to a simple general awareness protocol server as described in U.S. provisional patent application No. 60/124,218, filed Mar. 15, 1999, which application is hereby incorporated herein by reference in its entirety.

Client 12 further contains a number of applications 32, including, for example, the MS Word word processing program and MS PowerPoint presentation program, both as available from Microsoft Corp. A native application interface layer 33 allows the system to interact with the document application and preparation tools via application specific drivers.

The operations of the server 10 and, more particularly, client 12 are now described with reference to the flow charts in FIGS. 3–7 and exemplary screen displays shown in FIGS. 8–27. These operations cover the access to user and document data and collaboration tools. Prior to execution of these operations, a user establishes the tasks by creating a task object and associating it with a select number of documents involved in the task and a select number of users to be involved in the task. The task objects 26 having the properties described above are then generated based on these selections.

Figure 3:
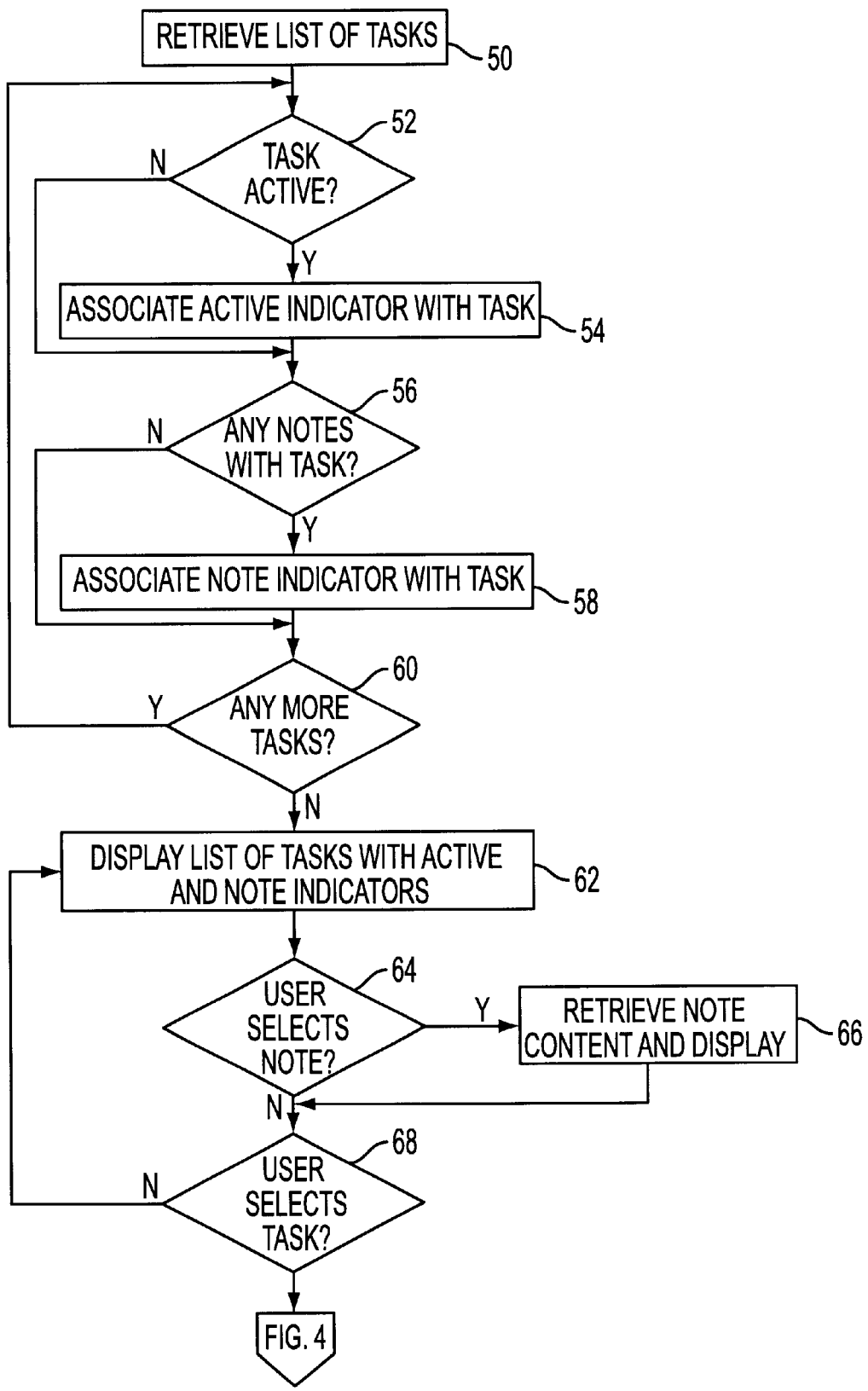
FIG. 3 is a flow chart showing an exemplary process of retrieving and displaying a list of tasks performed in a client shown in FIGS. 1 and 2.
Figure 8:
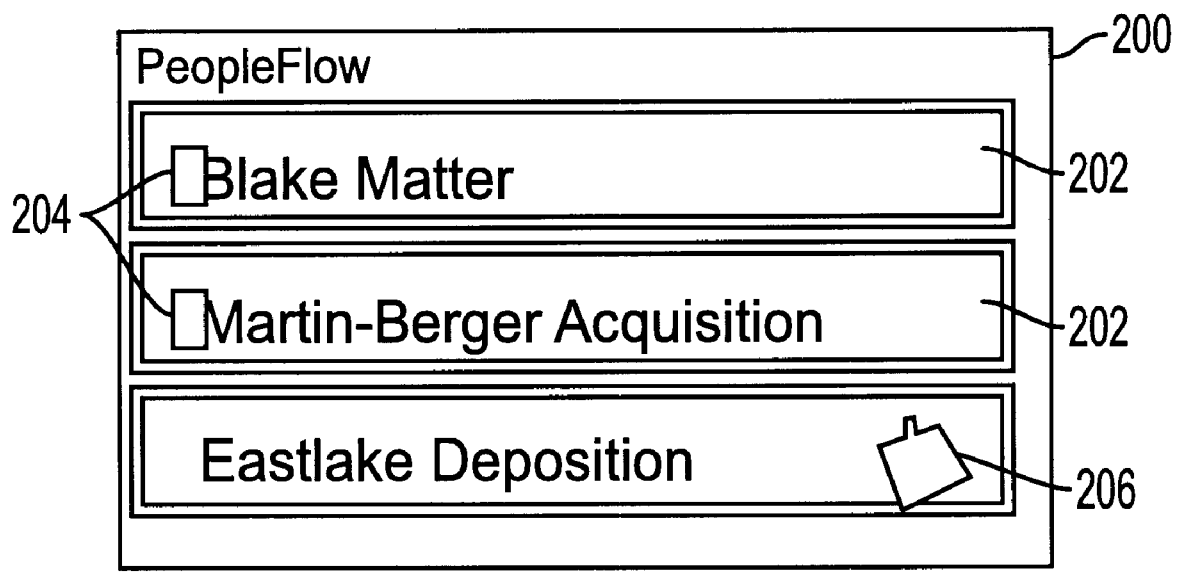

Referring to FIG. 3, at a user's request, the set of tasks is retrieved, step 50. The tool bar UI program 34 then determines whether the tasks is active, step 52, by checking whether any of the users associated with the tasks are active with any of the documents involved in the task. If active, the UI program associates an active indicator to the task, step 54. The UI program also checks whether any electronic notes are associated with the task, step 56 and, if so, associates a note indicator with the task, step 58. The process is repeated for all tasks. If no more tasks need be thus analyzed, step 60, the UI program displays a list of the tasks, by name or other identifier, along with the active and note indicators, step 62. Such as task list 200 is shown in FIG. 8, having three task entries 202 identified by task name. Two of the tasks have active indicators 204 displayed adjacent thereto, which, in preferred embodiments are colored green to indicate activity, and a third task has a note indicator 206 associated with it.

Figure 9:
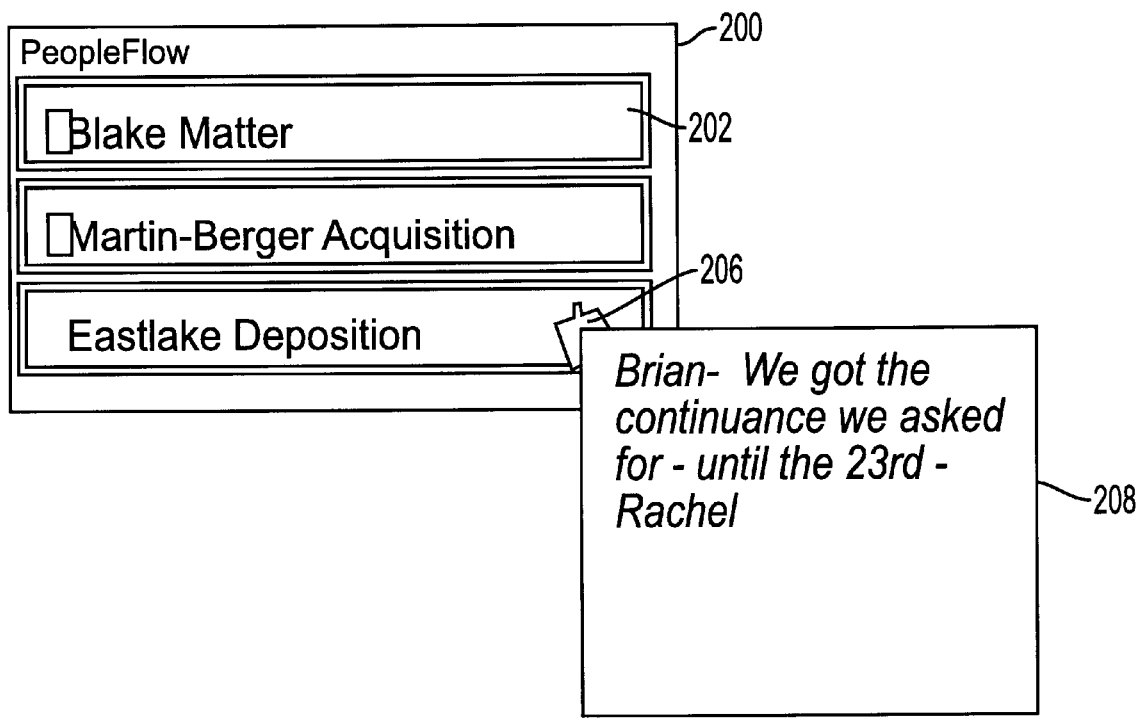

If a user selected the note indicator by selecting it with a mouse or other input device, step 64, the note content as stored by an electronic note collaboration tool is retrieved and displayed, step 66. The note content is displayed in a note UI 208 as illustrated in FIG. 9.

Figure 10:
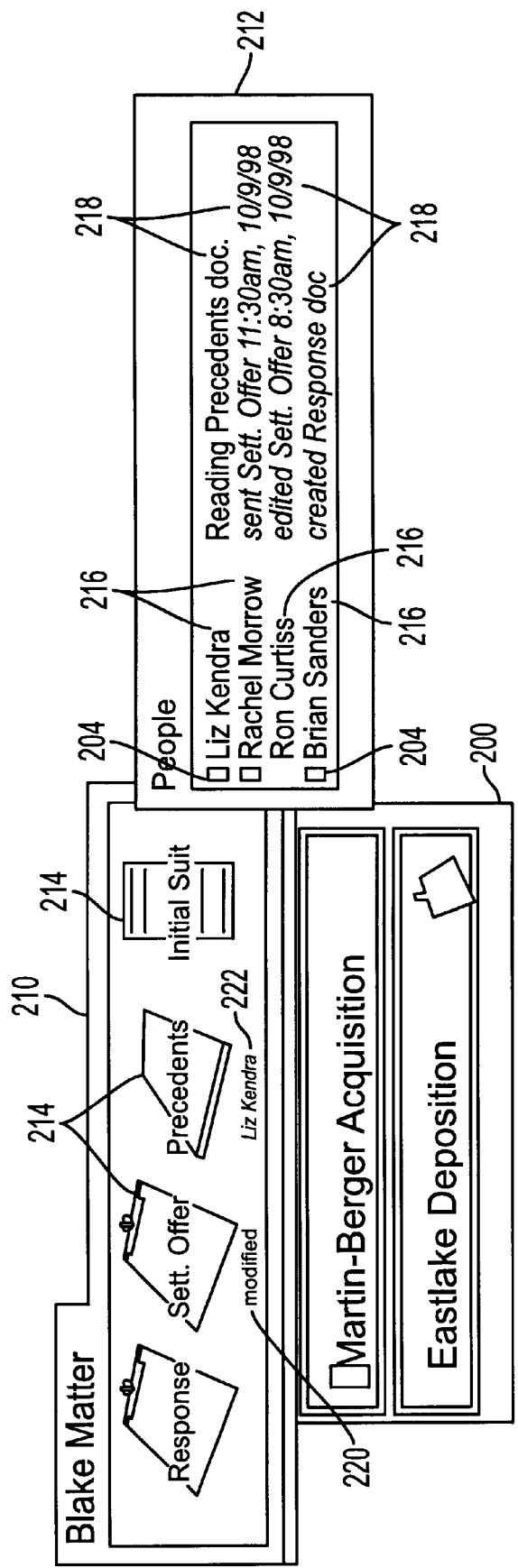

If the user selects one of the tasks, step 68, the tool bar UI generates two windows 210 and 212 illustrated in FIG. 10. A document window 210 displays graphical indicators of the set of documents 214 involved in and associated with the selected task, while a user or people window 212 displays a list of the set of users 216 involved in and associated with the selected task. The users 216 which are active are displayed with active indicators 204 and are further displayed with indications 218 of their current or most recent activity as retrieved from a history file or meta-data stored with the documents or by the server 10.

The process performed by the tool bar UI program 34 to generate the windows 210 and 212 is described with reference to FIGS. 4–5. When a task is selected, the UI program retrieves the set of usernames from the user profiles associated with the task, step 70, and retrieves the set of document names from the documents associated with the selected task, step 72. For each username, the UI program checks through the Sametime community server whether the user is currently logged in or on-line, step 74. If the user is on-line, the UI program associates an active indicator with the user, step 76. The UI program further checks through the server whether the user is currently actively working with a document in the set of retrieved documents for the task, step 78. If so, the UI program retrieves the document name and nature of the activity, step 82. If the user is not currently on-line or is not currently working on a document associated with the task, the UI program retrieves the most recent activity if any performed on a document in the project associated with the user, step 80, which may be stored in the user profile, task object, or a separate task history data file. The process is repeated for all other users associated with the task. If there are no further users to process, step 84, the UI program displays the lists of usernames along with any active indicators, activities and document names retrieved, step 86.

As a result, a people tool bar 212 is displayed as shown in FIG. 10 showing the list of users involved in the selected project, their active status, and what activity they are currently performing on a document in the task or otherwise what activity they most recently performed.

Figure 5:
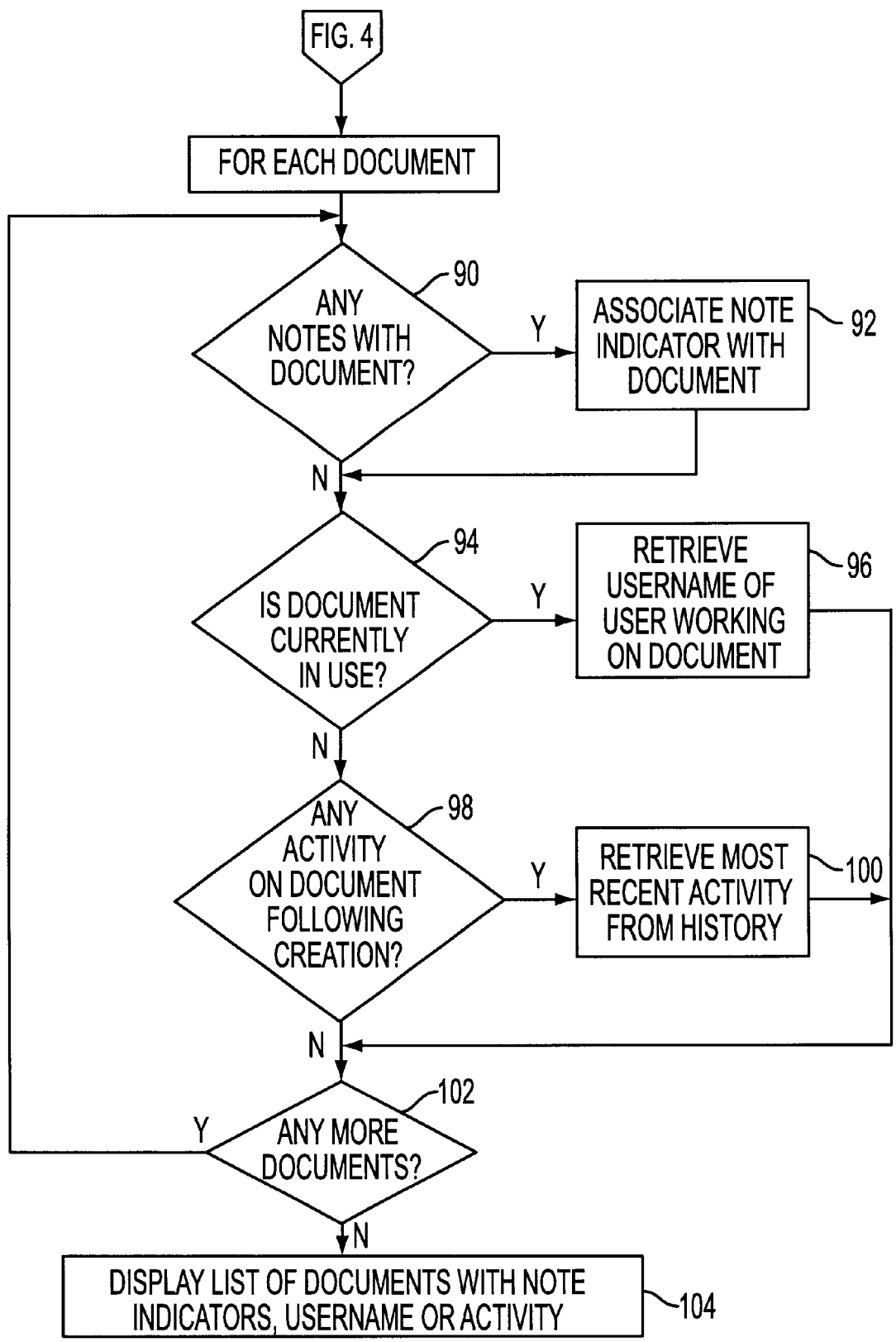

Referring to FIG. 5, the document tool bar 210 is generated by, for each document found associated with the selected task, determining whether any electronic notes are associated with the document, step 90 ad associating a note indicator with any such documents, step 92. The UI program further determines whether the document is currently in use, step 94, and if so, retrieves the username of the user working on the document, step 96. If the document is not currently undergoing activity, the UI program determines, from the document meta-data or history data file, whether any activity has been performed on the document since its creation, step 98. Is such activity has been performed, the UI program retrieves the most recent activity performed on the document, step 100. The process is repeated for all documents in the task. When there are no more documents to process, step 102, the UI program displays the tool bar 210 with the list of documents and any note indicators, usernames or activities associated therewith.

As a result, a document tool bar 210 is displayed as shown in FIG. 10 showing the list of document, in graphical and text form, involved in the selected project, any note indicators (see 206 in FIG. 12), and the name of a user or users 222 currently working on the document or the activity 220 most recently performed on the document.

The UI program updates the tool bars using the logic described herein as new information is received from the server regarding the status of the documents and users.

Figure 4:
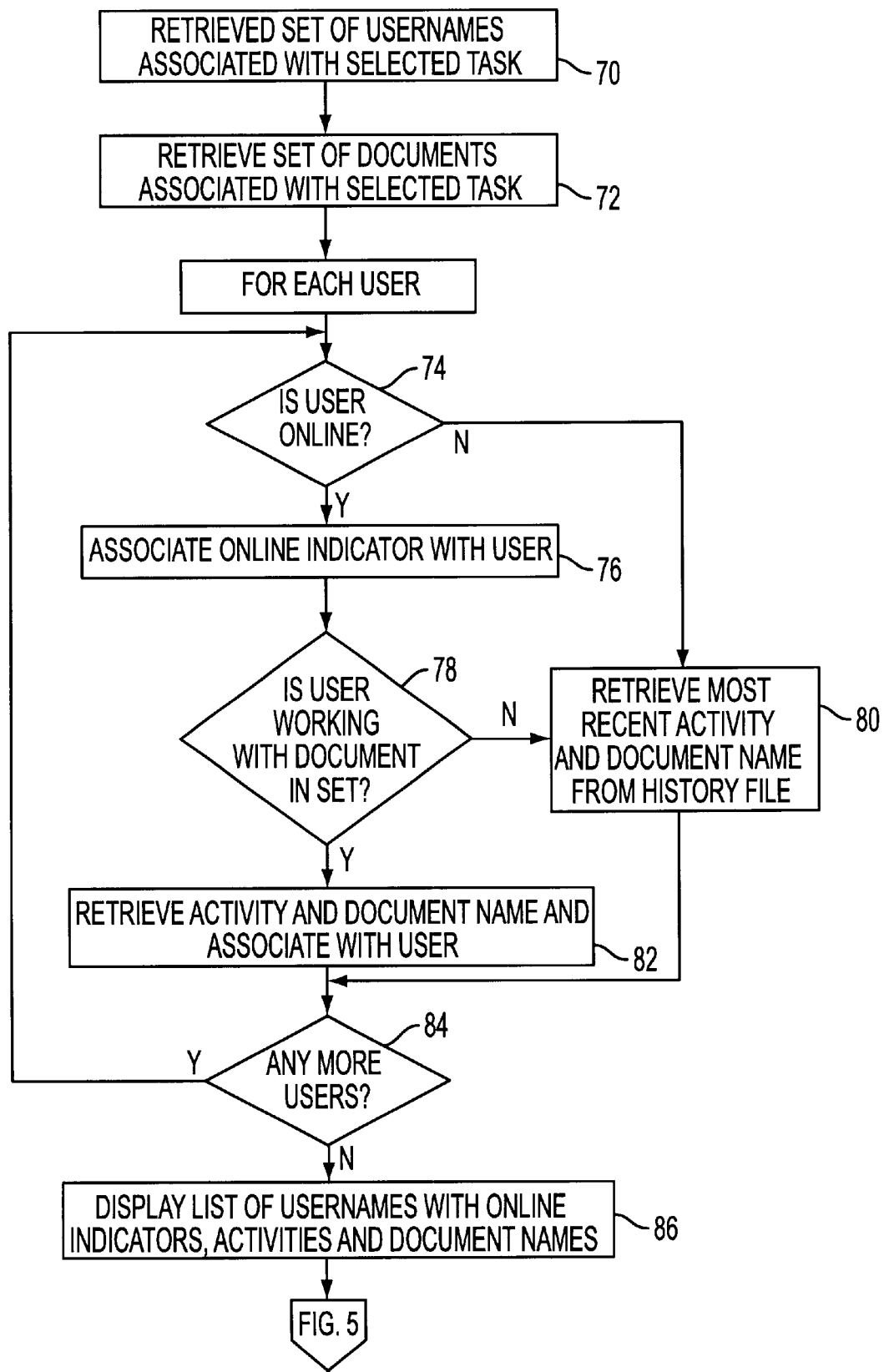
FIGS. 4–5 contain a flow chart showing an exemplary process of retrieving and simultaneously displaying user- and document-related information relating to a task selected from the list generated in FIG. 3.

As one skilled in the art will recognize, the logic of the processes illustrated in FIGS. 4–5 may be varied within the spirit of the invention to achieve specific desired results. For example, the active indicators for users may be generated based on their current performance of activity on a document rather than being present on-line. Similarly, audio indicators may be used in place of the visual indicators, or additional visual or audio indicators may be provided to highlight or distinguish activity information which is new to the particular user viewing the tool bars, such as since a prior instance of system access.

Figure 6:
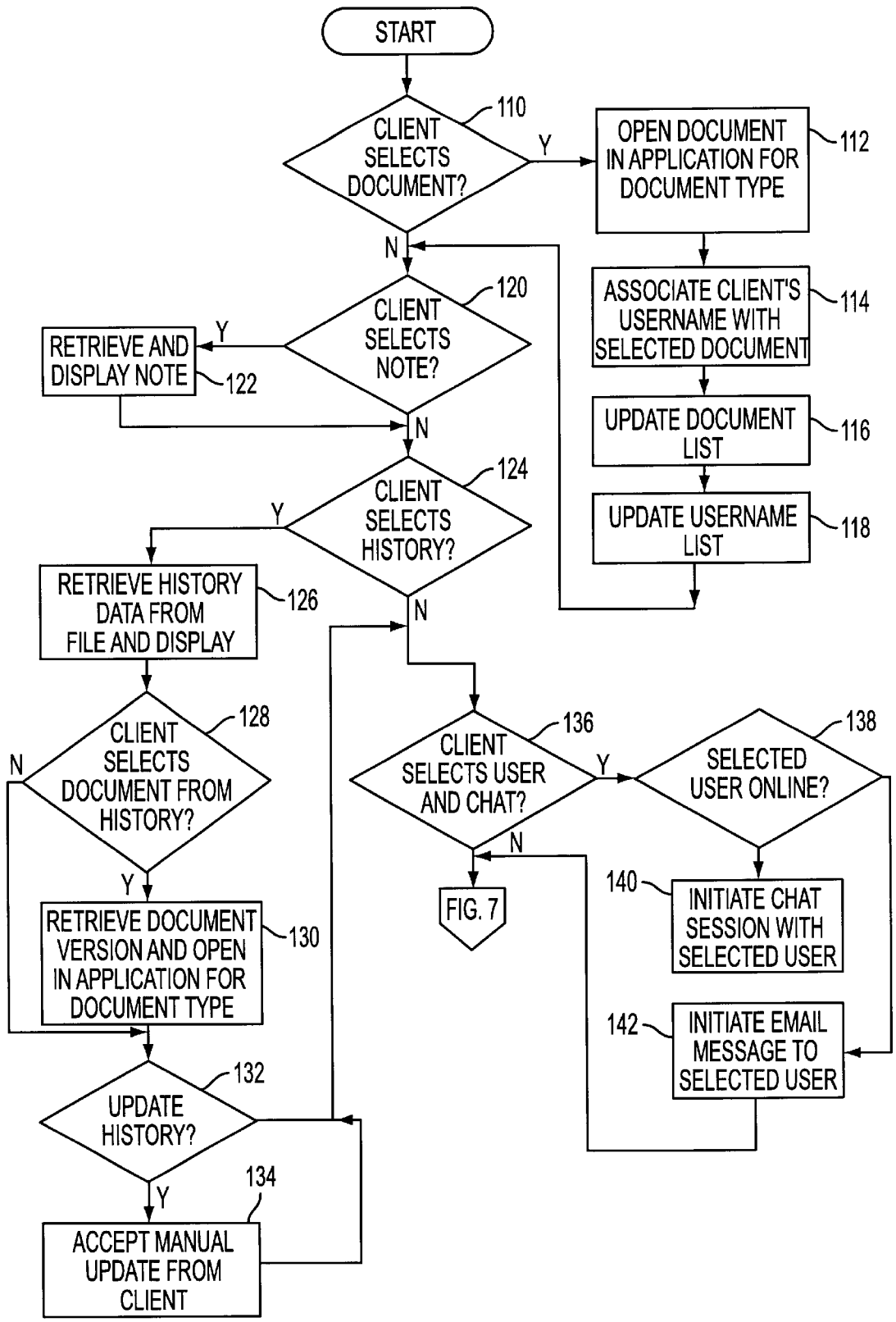
FIGS. 6 and 7 contain a flow chart showing an exemplary process of initiating a variety of collaborative software tools using the user- and document-related information displayed as a result of the process shown in FIGS. 4–5, FIGS. 8–27 are exemplary screen displays generated and displayed as a result of the processes shown in FIGS. 3–7.
Figure 11:
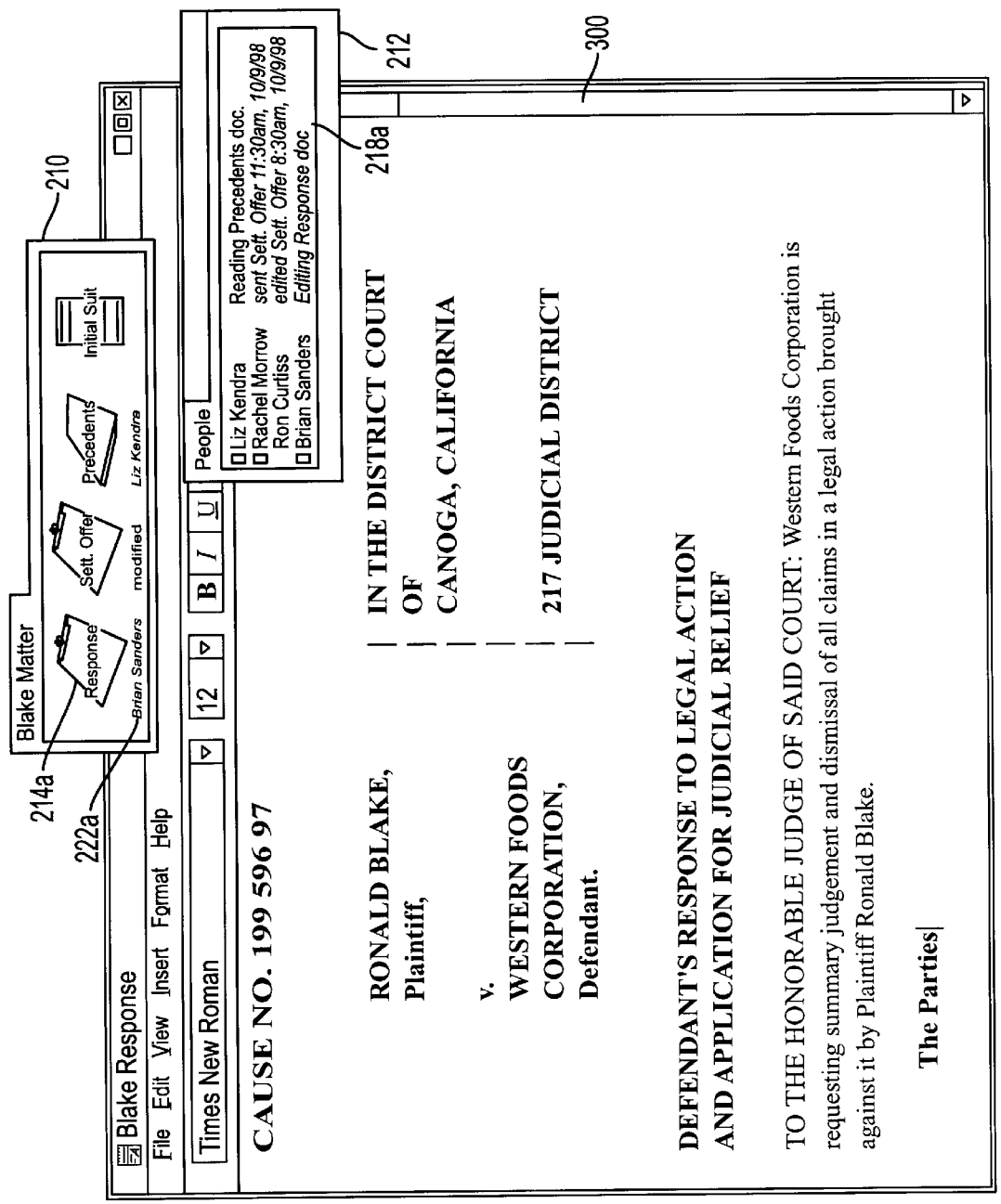

Processes of using the tool bars to access applications or collaboration tools are now described with reference to FIGS. 6–7. If a client (meaning in this context one of the users in the project viewing and accessing the tool bars; in the particular case in the drawings, the client is "Brian Sanders") selects one of the documents from the document tool bar 210, step 110, the selected document is opened in an application program of the appropriate type, step 112, in accordance with processes known to those of skill in the art FIG. 11 illustrated selected of the text document Response-.doc from the document tool bar 210, resulting in the opening of a word processing window 300 and the document. The client continues to work with the document, as shown in FIG. 12.

The client's name is then associated with the selected document in the server, step 114, which propagates this new event information to update all the project users' document tool bars, step 116, and user tool bars, step 118, to reflect the client's becoming active with the selected document. Thus, as shown in FIGS. 11 and 12, the UI program has updated the document tool bar 210 with the insertion of the client's name 222*a* ("Brian Sanders") for the selected document 214*a*, and has updated the activity indicator 218*a* for the client to reflect that the client has begun editing the selected document.

Figure 12:
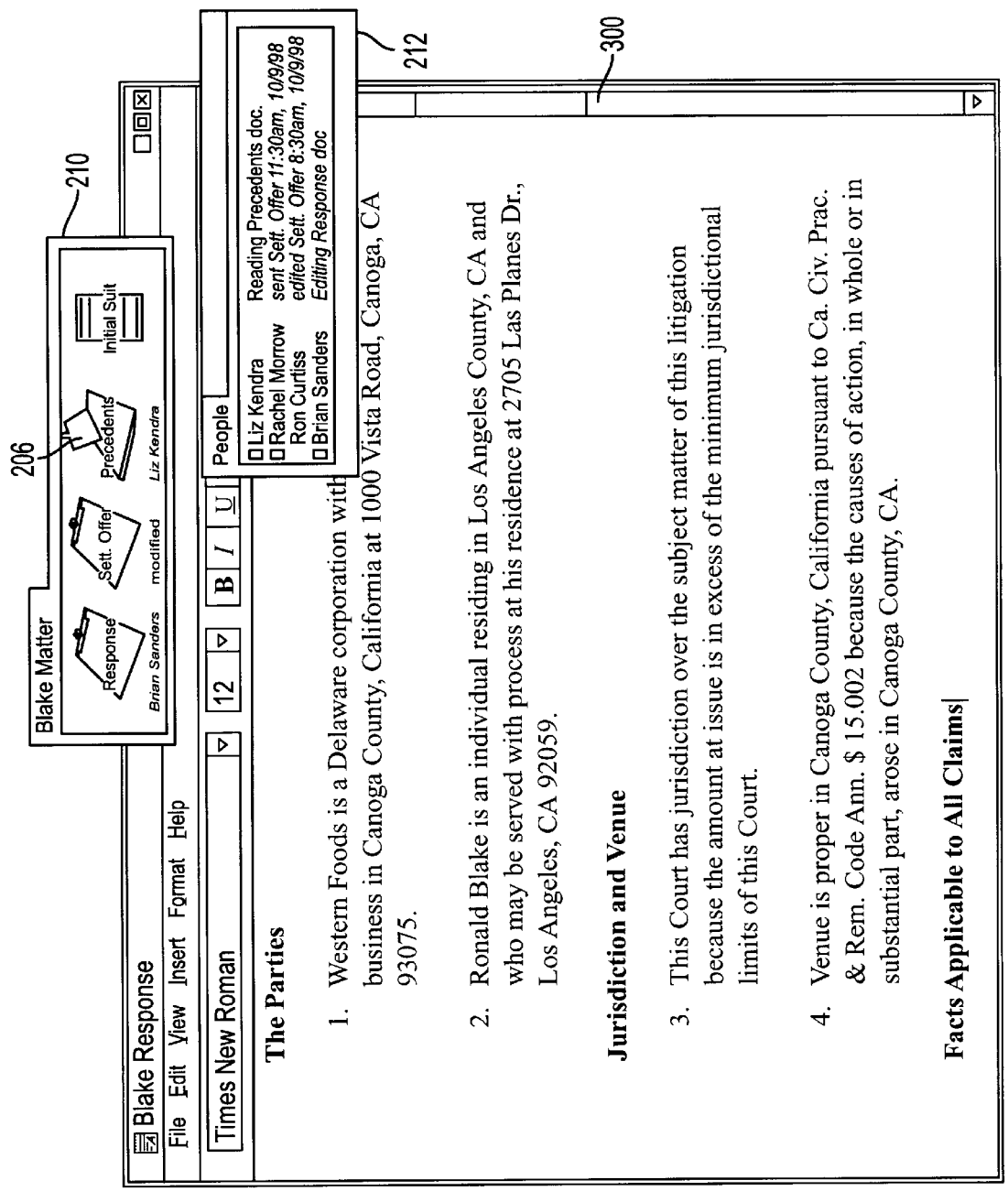
Figure 13:
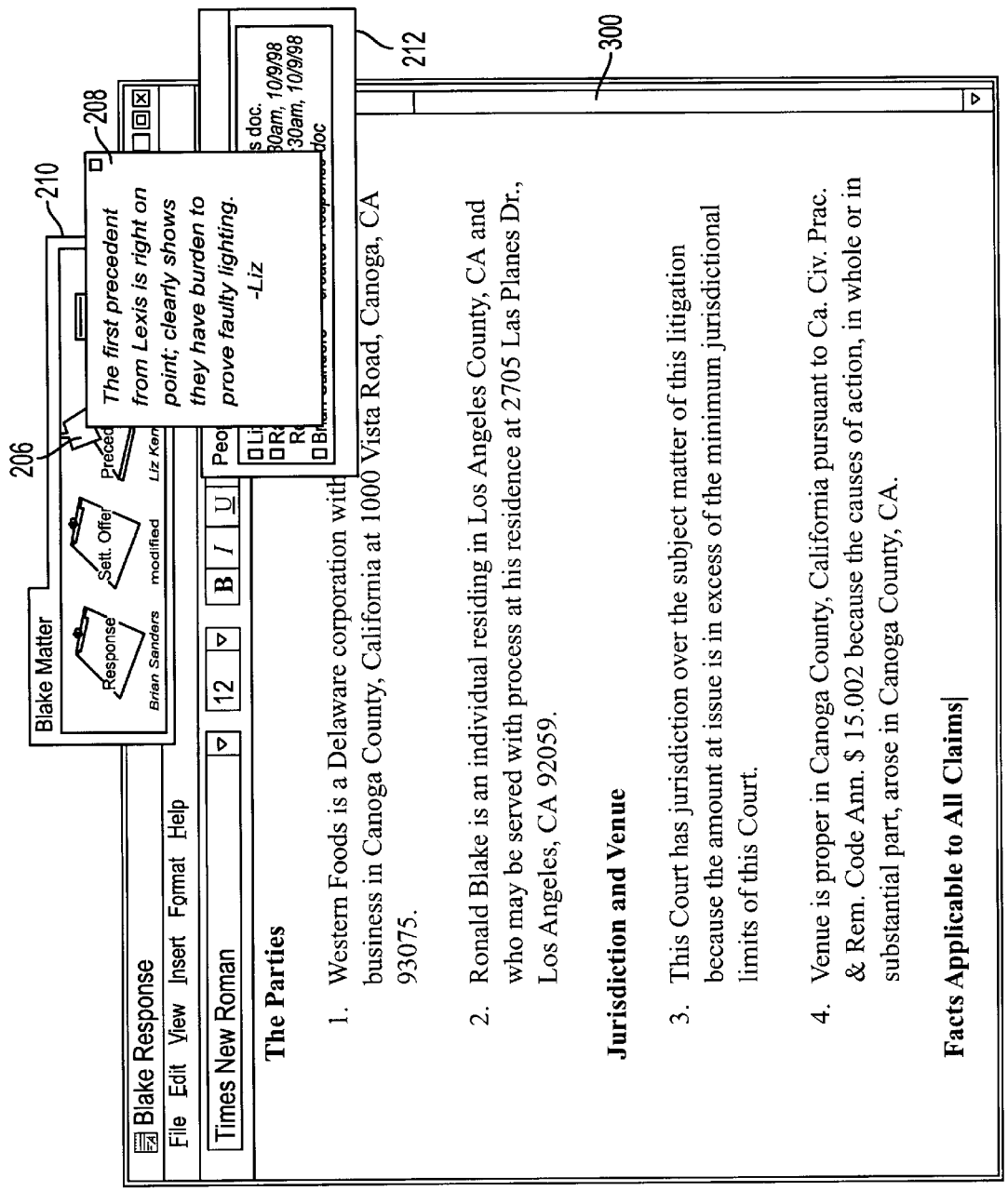
Figure 14:
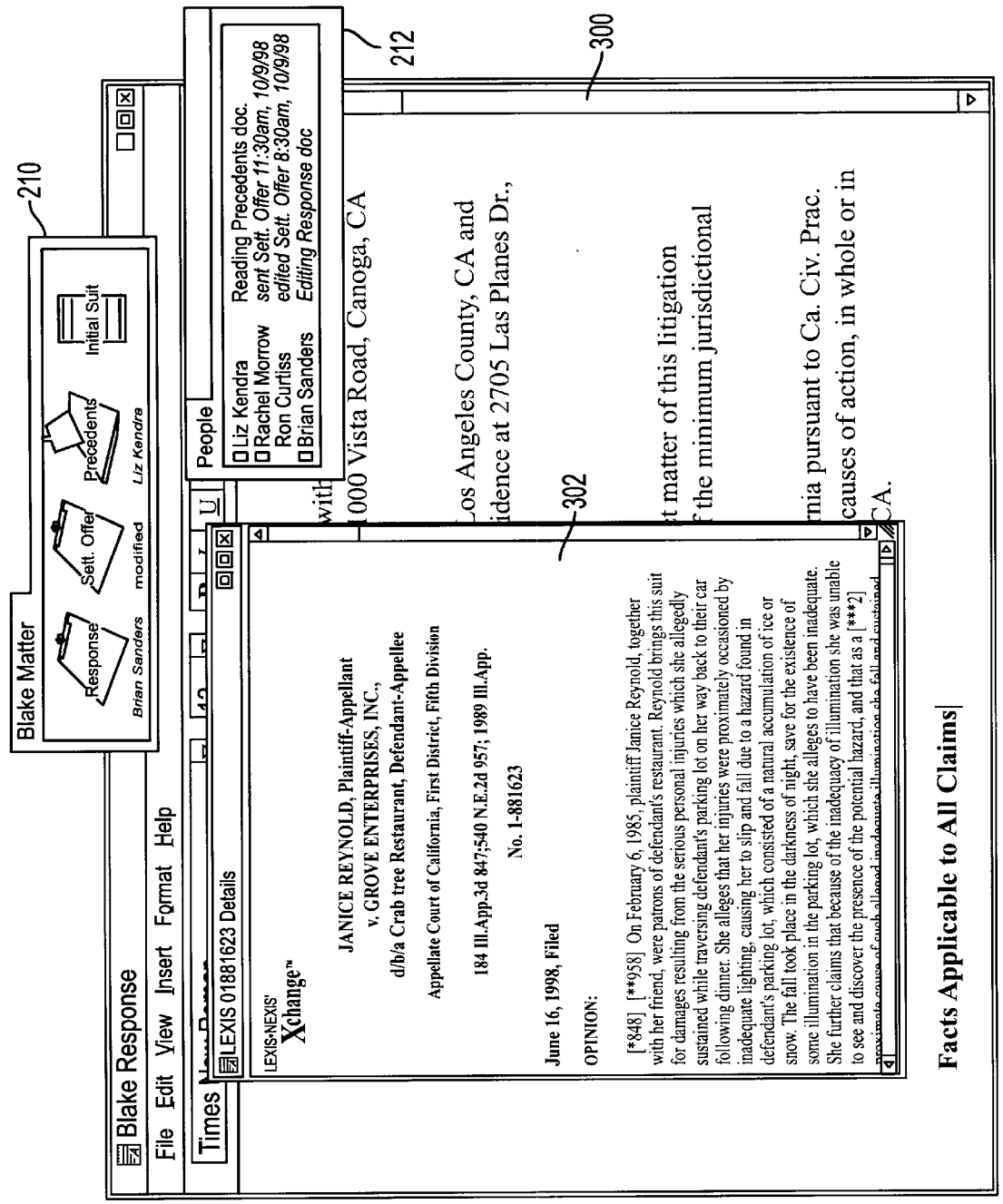
Figure 15:
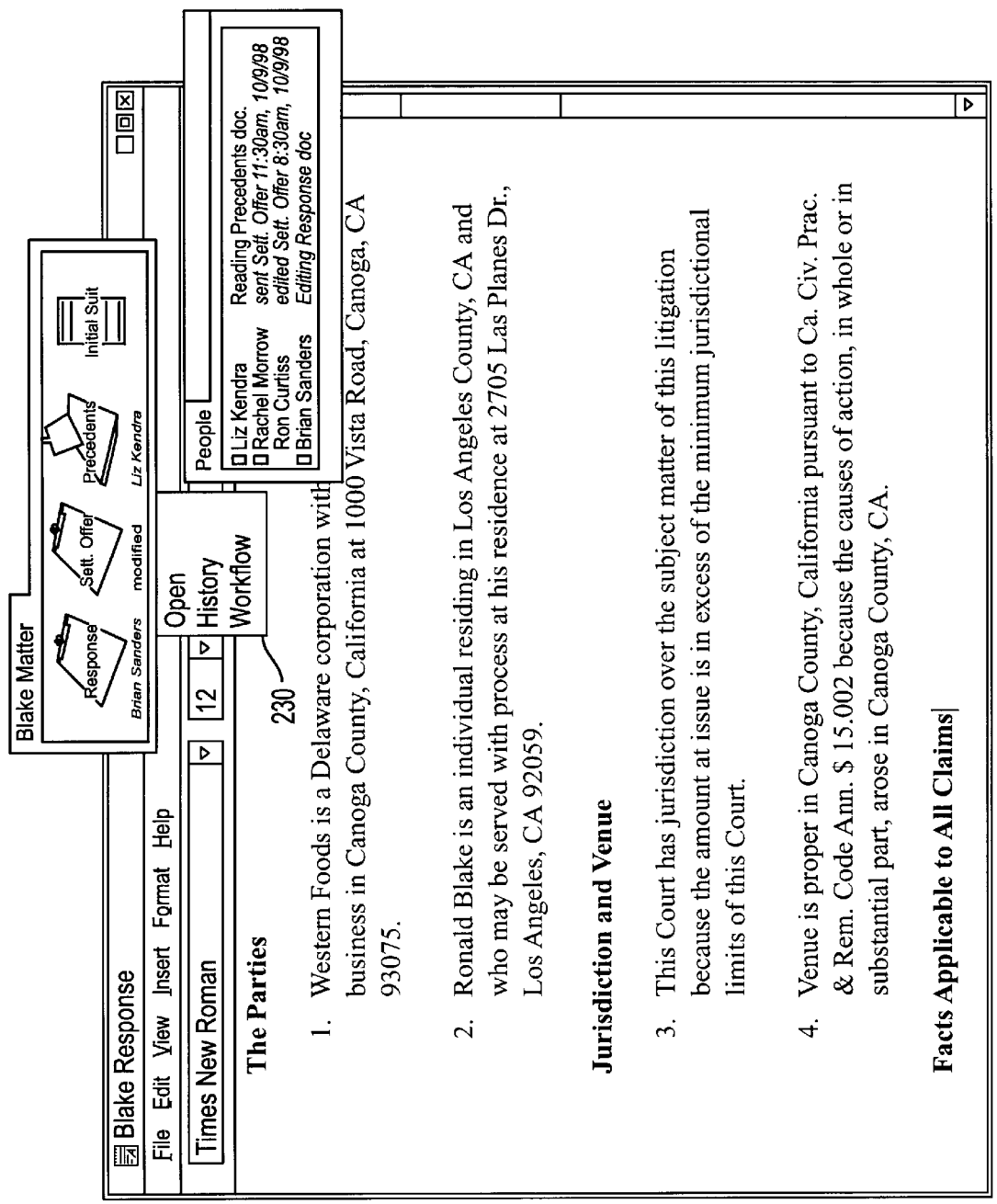

As further shown in FIG. 12, another user, "Liz Kendra" has created an electronic note relating to the document upon which she was working, and the UI program received the note data from the server and placed a note indicator 206 next to the document associated with the note. If the client selects the note, step 120, the note collaboration tool retrieves the note content and displays it in note UI 208, as illustrated in FIG. 13. The client may then select the another document, such as the document associated with the note, to thereby cause another application window 302 to open with the document, as shown in FIG. 14.

Figure 17:
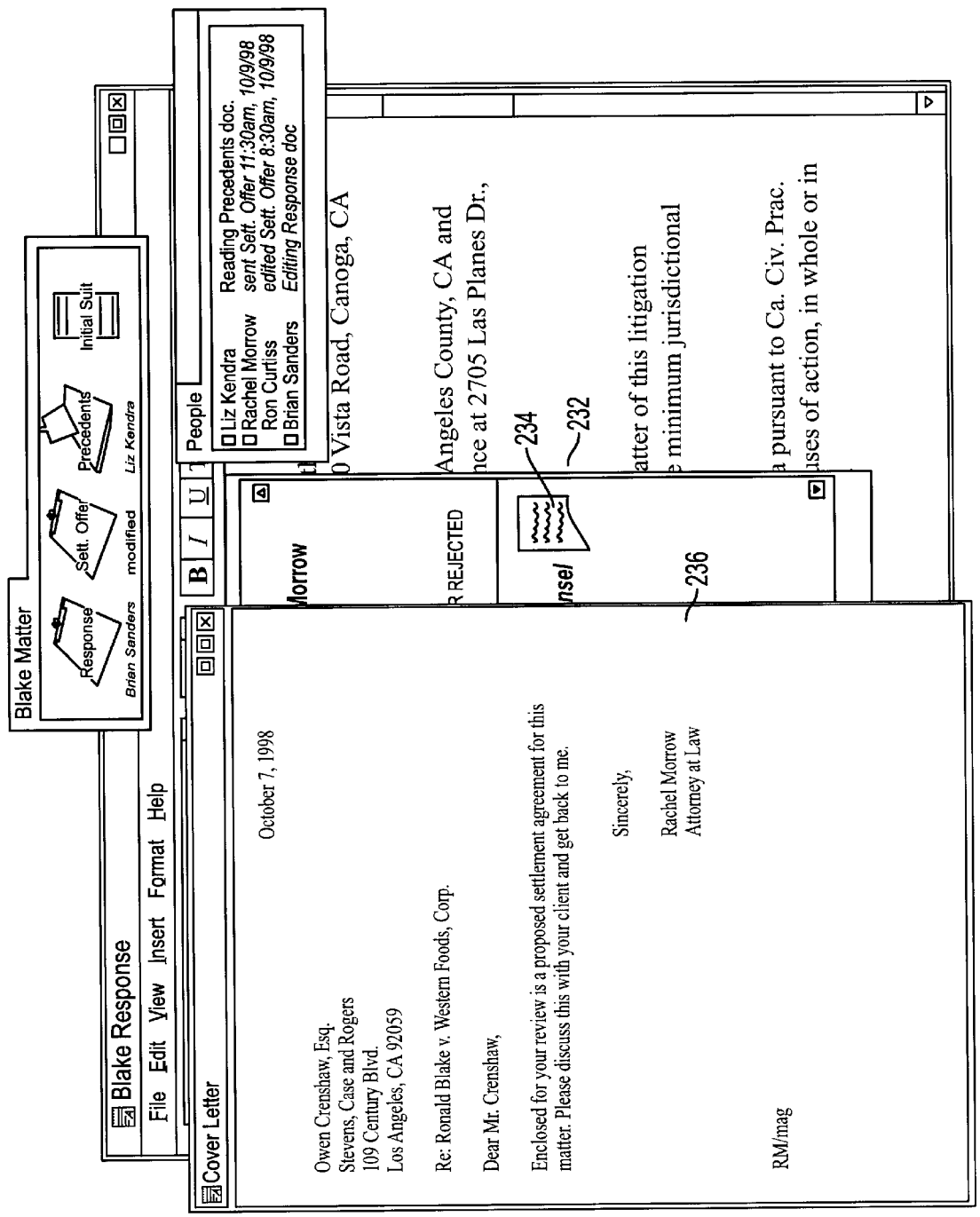
Figure 18:
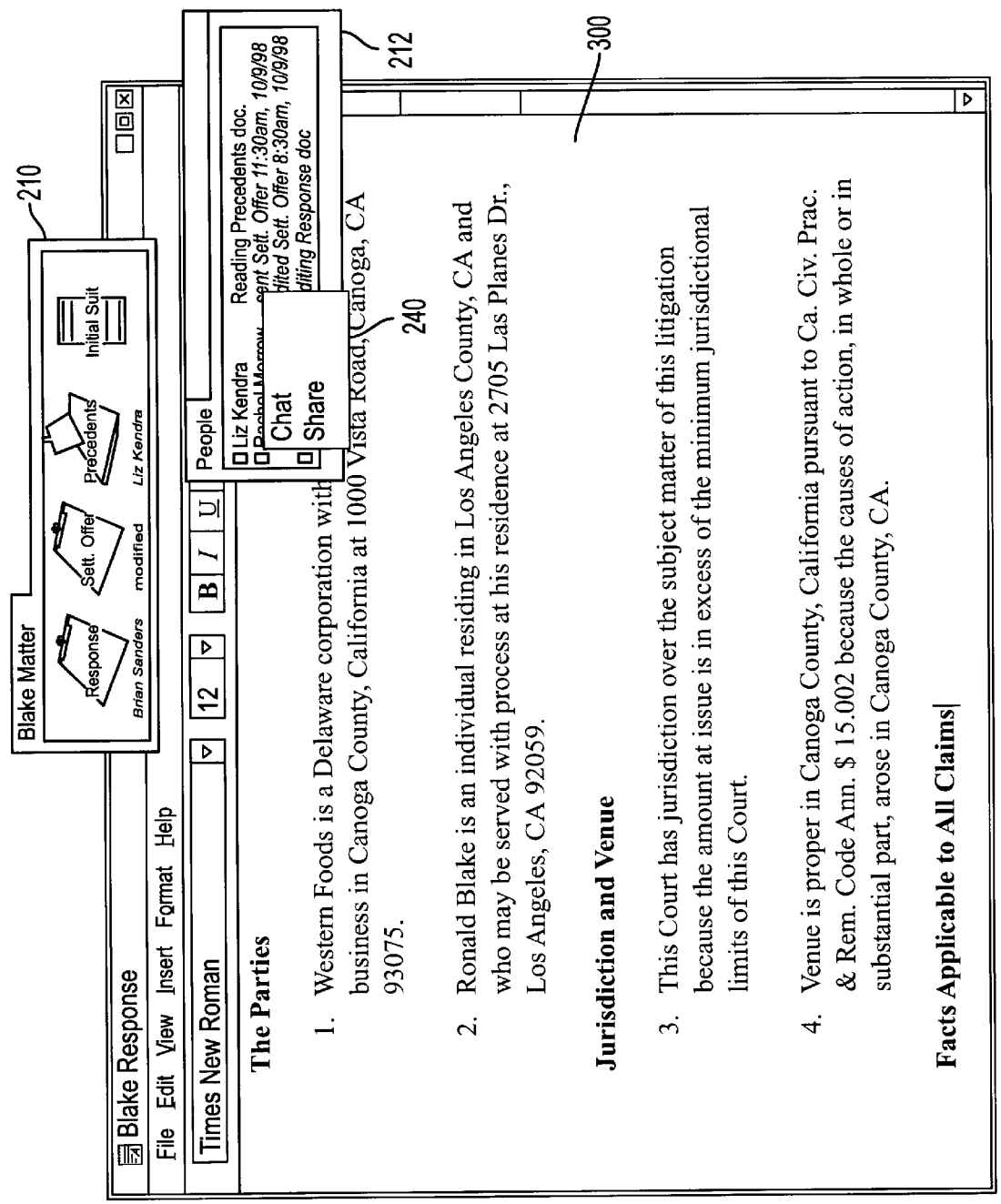

Another collaborative tool accessible to the client is the document history file. A client may perform an input action such as right-clicking a mouse to generate a document menu UI 230 (FIG. 15), which includes options to open a selected document, view and manipulate the history of the document and view and manipulate the workflow for the document. If the client selects the history option from menu 230, the UI program retrieves history data from a history file or document meta-data and displays it in a history window 232, step 126. The history window lists activities performed on the document, in text and graphic form, and displays icons 234 representing other documents such as cover letters associated with particular activities. The client may select any of the document history activity entries, step 128, in which case the version of the document resulting from the selected activity is retrieved and displayed in an application window, step 130. Also, the client may select the additional document icon to display an application window 236 embodying that other document, as shown in FIG. 17. This therefore allows users to identify which version of a document they are working with to facilitate collaborative review of the document.

In preferred embodiments, the document history contains events automatically recorded by the document management system running on the server but also to receive manually input events. Thus, the client may opt to update the history with a manual event, step 132, and the UI program accepts manual input of an activity and updates the history data file or document meta-data set, step 134. The manually input activity data is naturally propagated to other users by the server. This allows for storage of non-automatically recorded events, such as document "sent to opposing counsel" as indicated in the history window 232 in FIG. 16.

Figure 19:
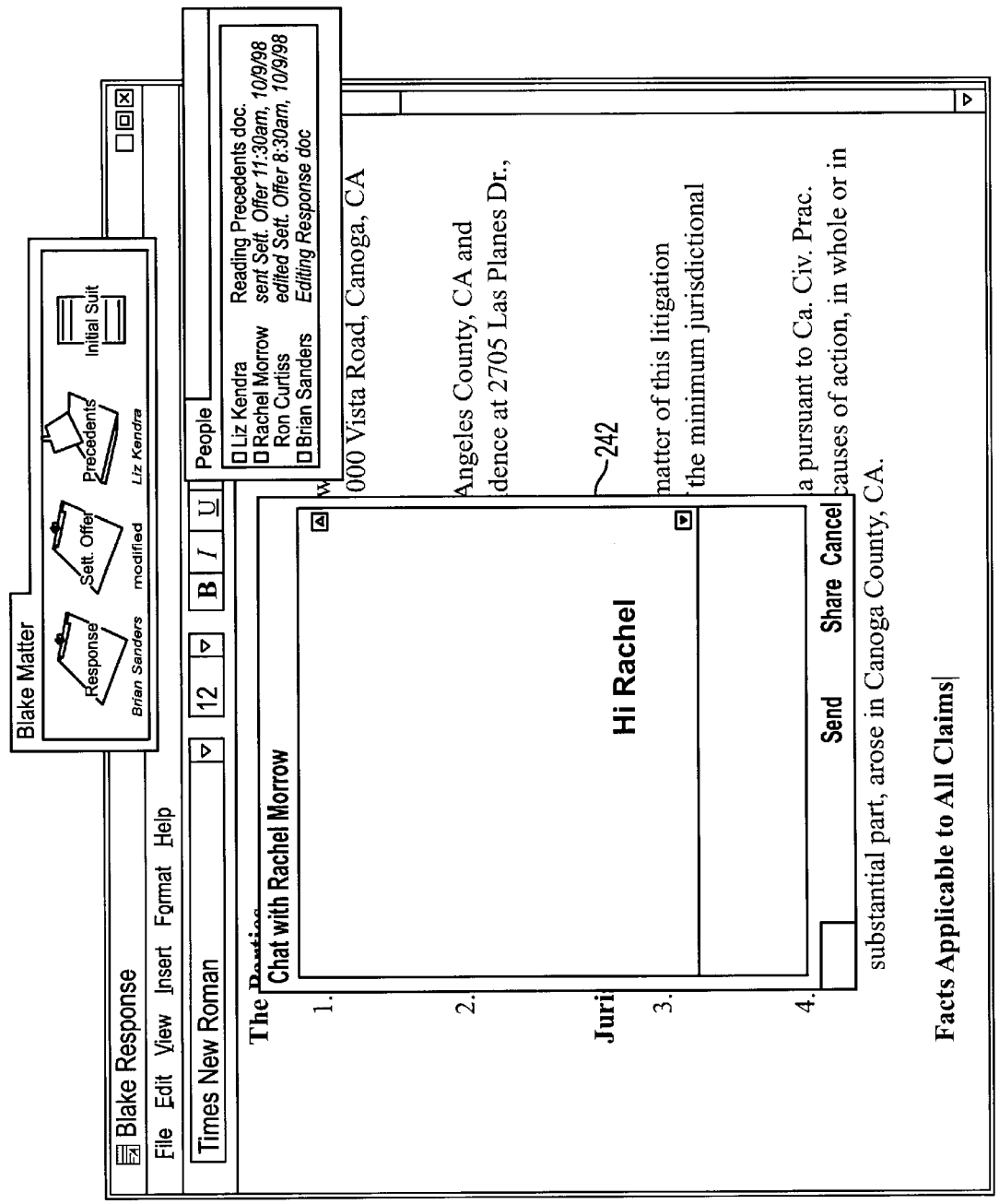
Figure 20:
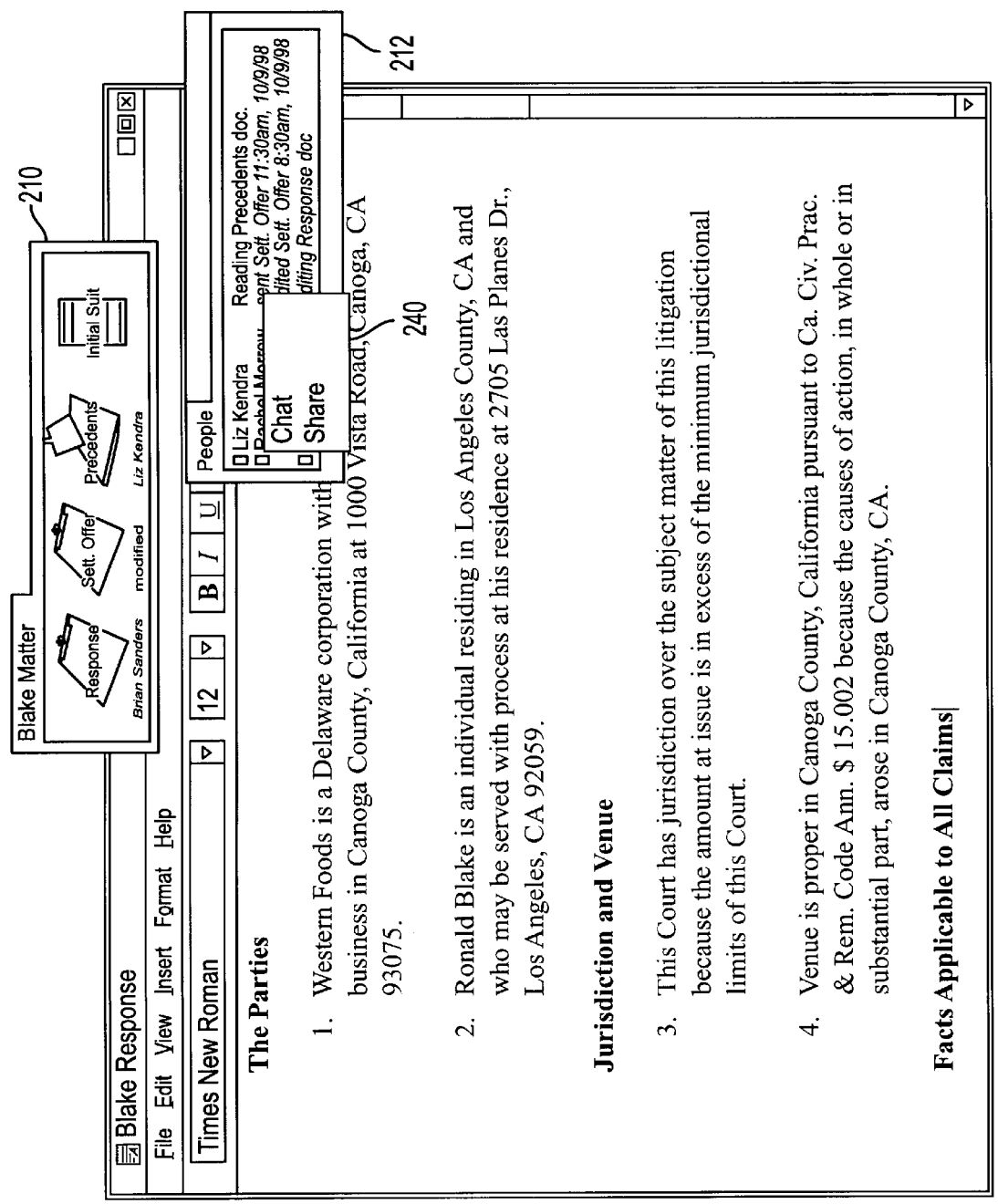

The client may also bring up a people option menu UI 240, which provides the options of initiating a chat or share session with a selected user. If the client selects to chat with a specified user, step 136, it is determined whether the selected user is on-line, step 138, either by checking the status information on the client or referring back to the server. If the other user is on-line, a chat window is generated, step 140, as illustrated in FIG. 19, and a chat session is carried out until terminated. If the other user is not on-line, an asynchronous communication such as email is established, step 142.

Figure 7:
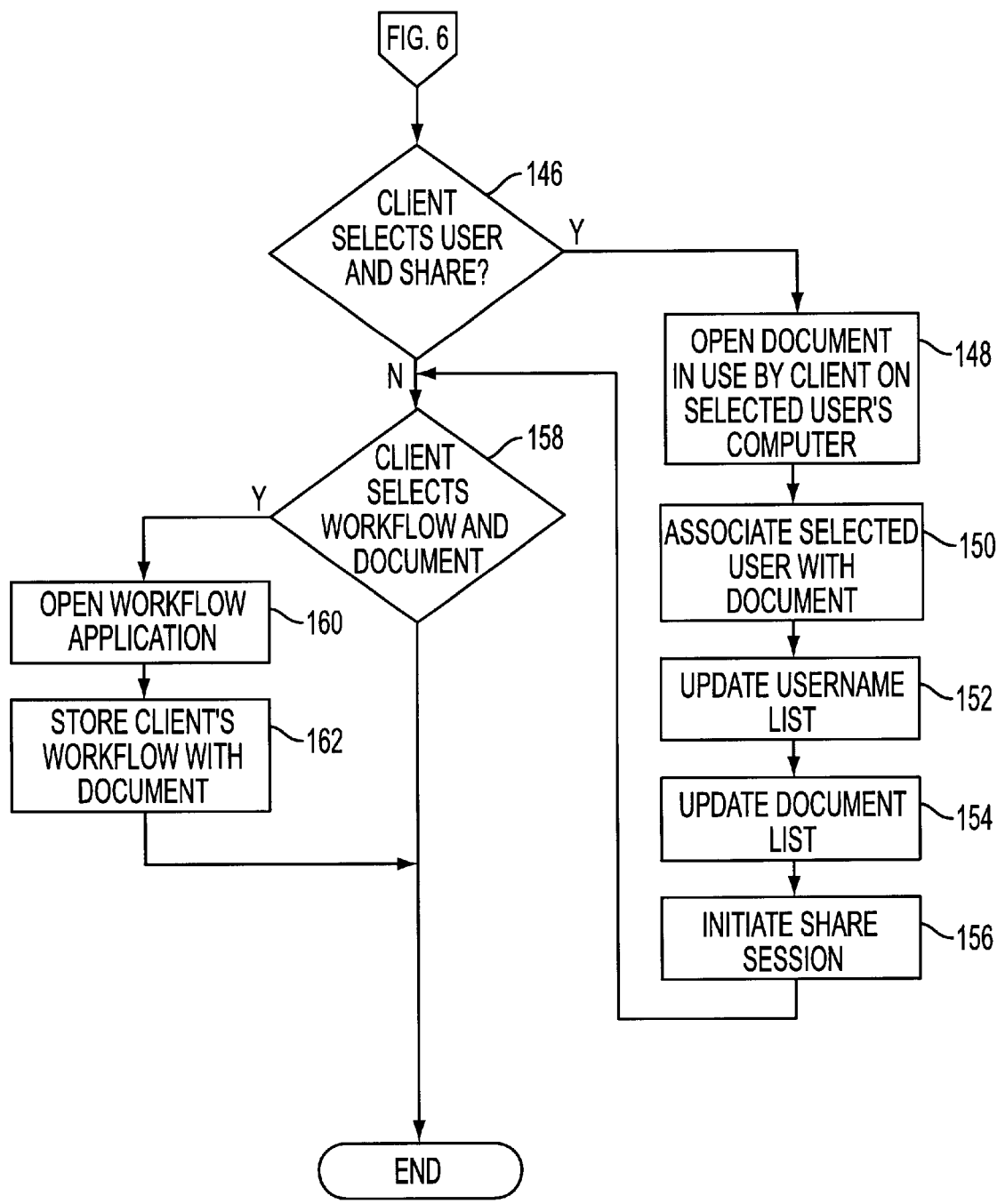
Figure 21:
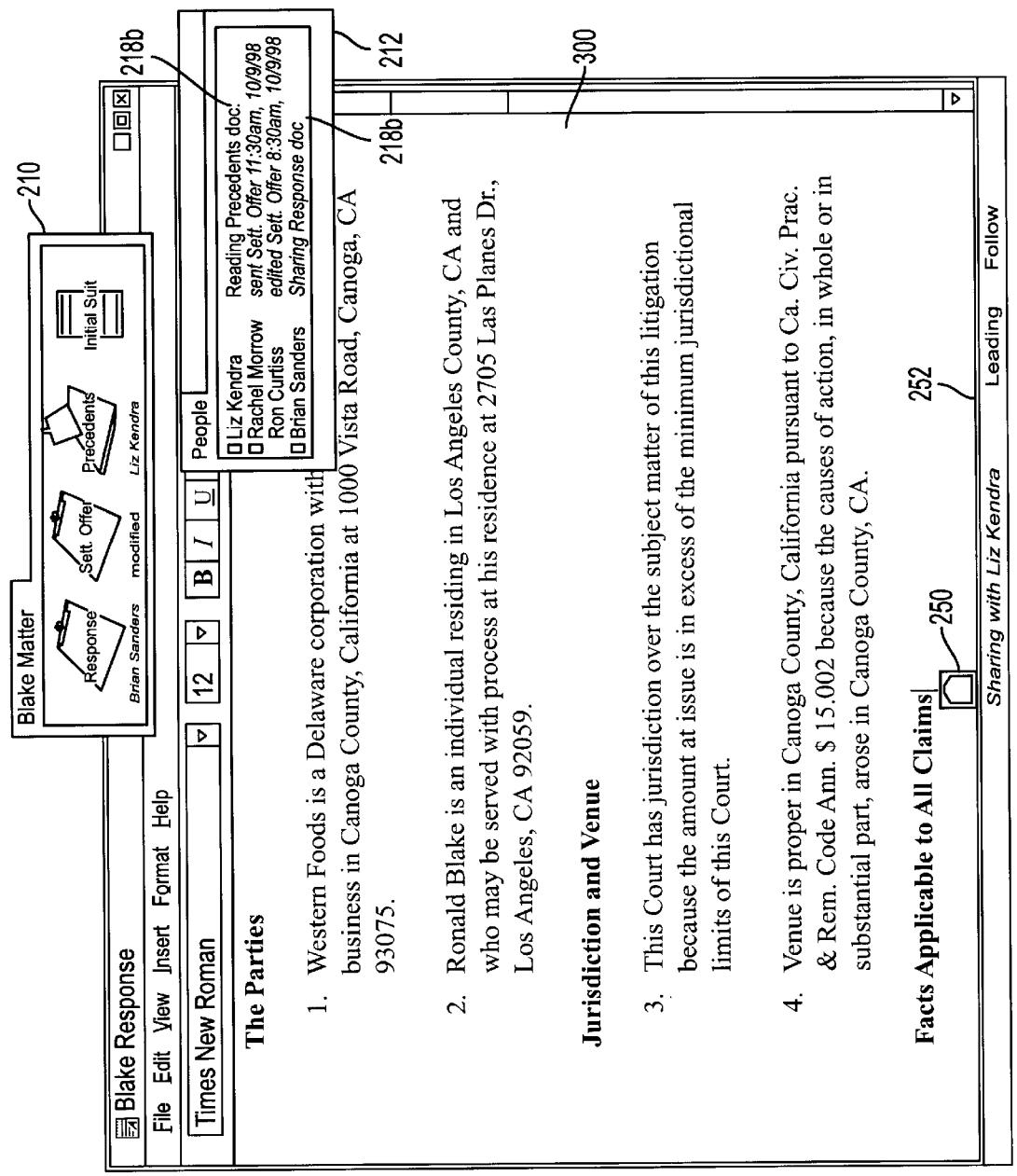

Referring now to FIG. 7, if the client selects the share option, step 146, from the people option menu 240 (FIG. 20), the Sametime server initiates a document share session for the document currently used by the client. The document is opened in an application window of the selected user's client computer, step 148. The selected user's name is associated with the document, step 150, and the user and document tool bars are updated trough propagation of the updated information, steps 152 and 154, respectively. Thus, as shown in FIG. 21, the activity indicators 218b for client "Brian Sanders" and selected user "Liz Kendra" are updated to reflect their status as sharing the selected document Response.doc.

Figure 22:
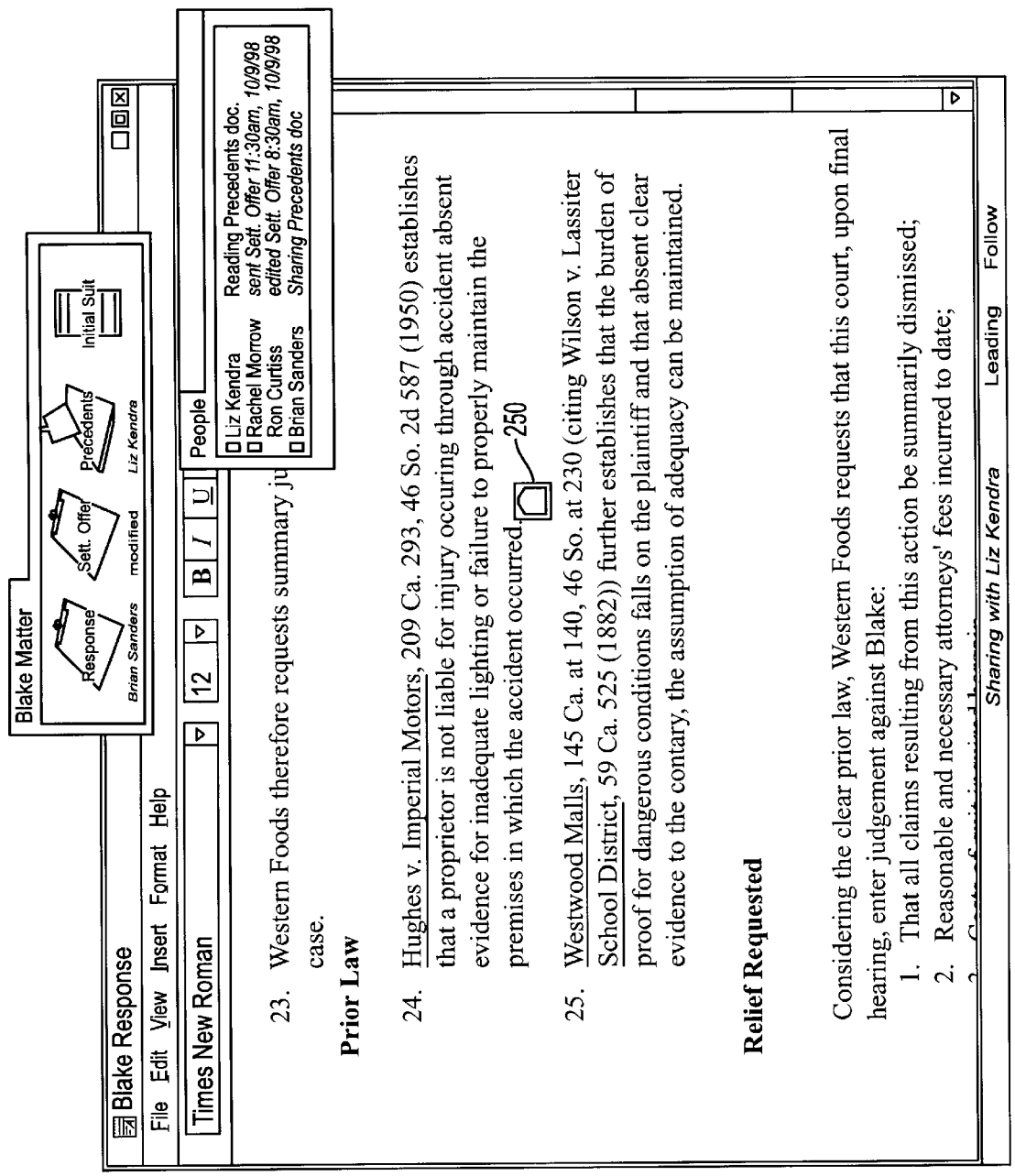

In addition, a sharing session is initiated until terminated, step 156. The Sametime server generates a pointer graphic 250 in the client's application window 300 to indicate the location at which the client or selected user is viewing the document, depending upon whether the client or selected user is designated as the leader of the sharing session, and a status bar 252 to track the status of the sharing session. The pointer graphic moves to follow movement through the document, as shown in FIG. 22.

Figure 23:
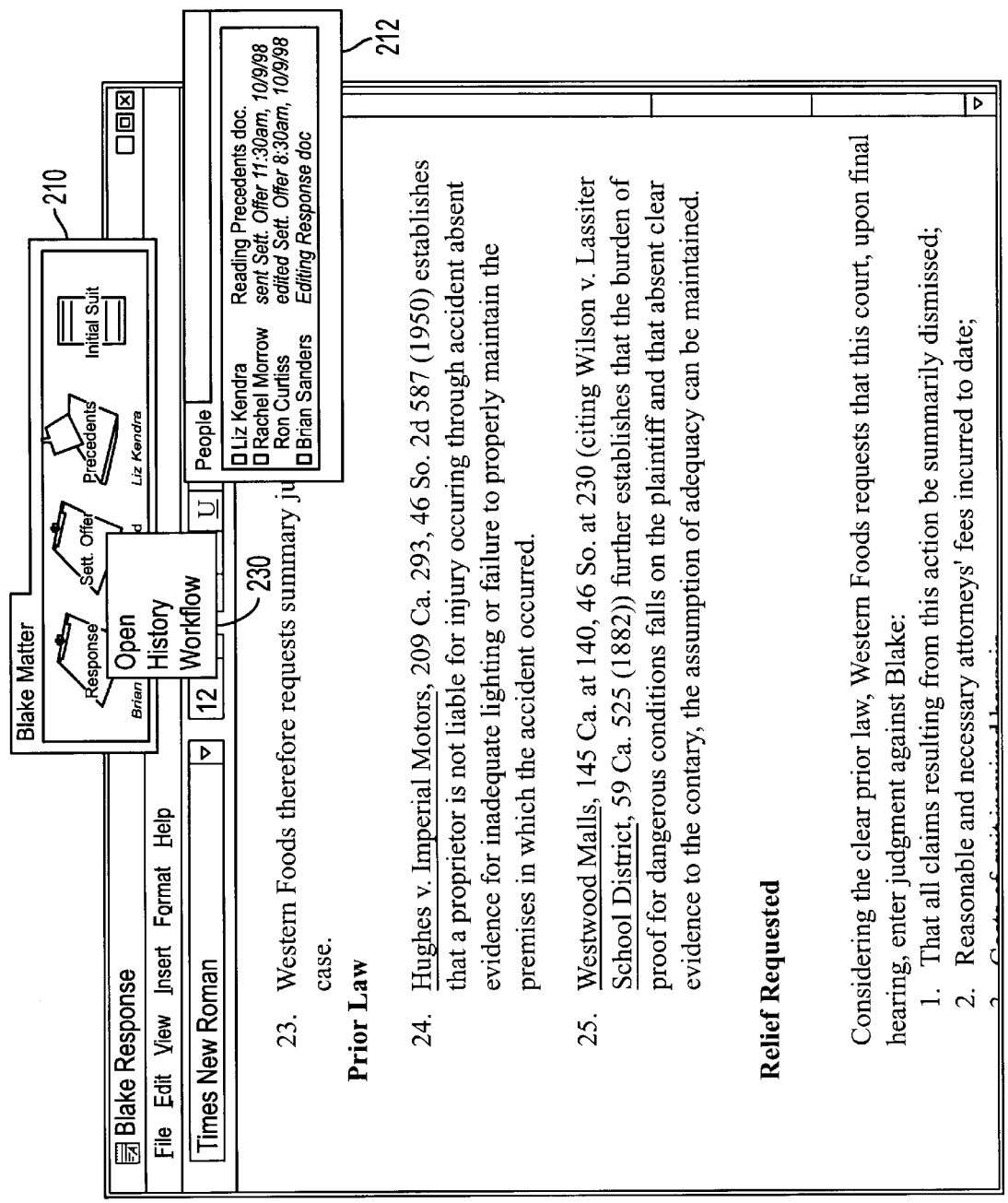
Figure 24:
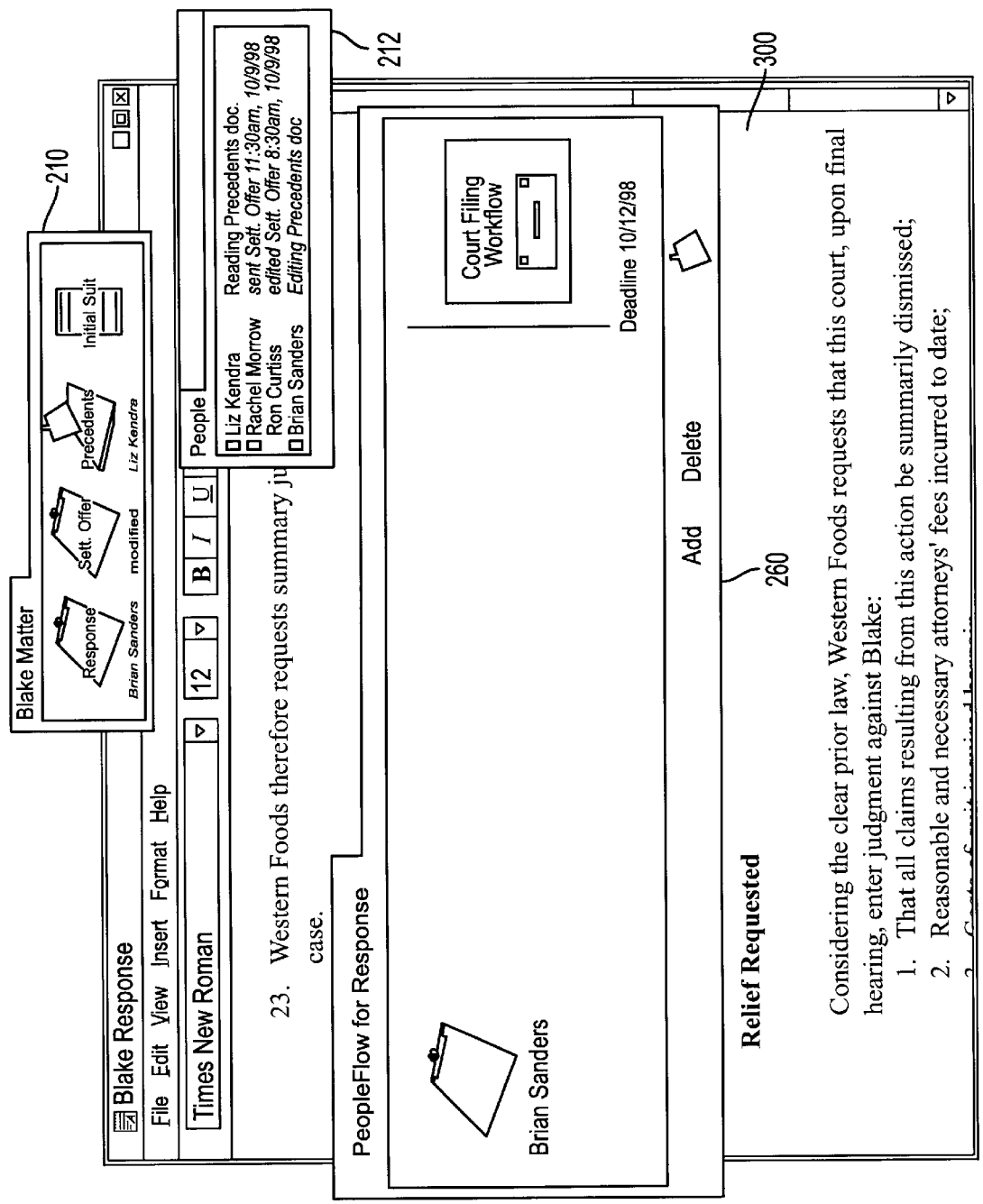
Figure 25:
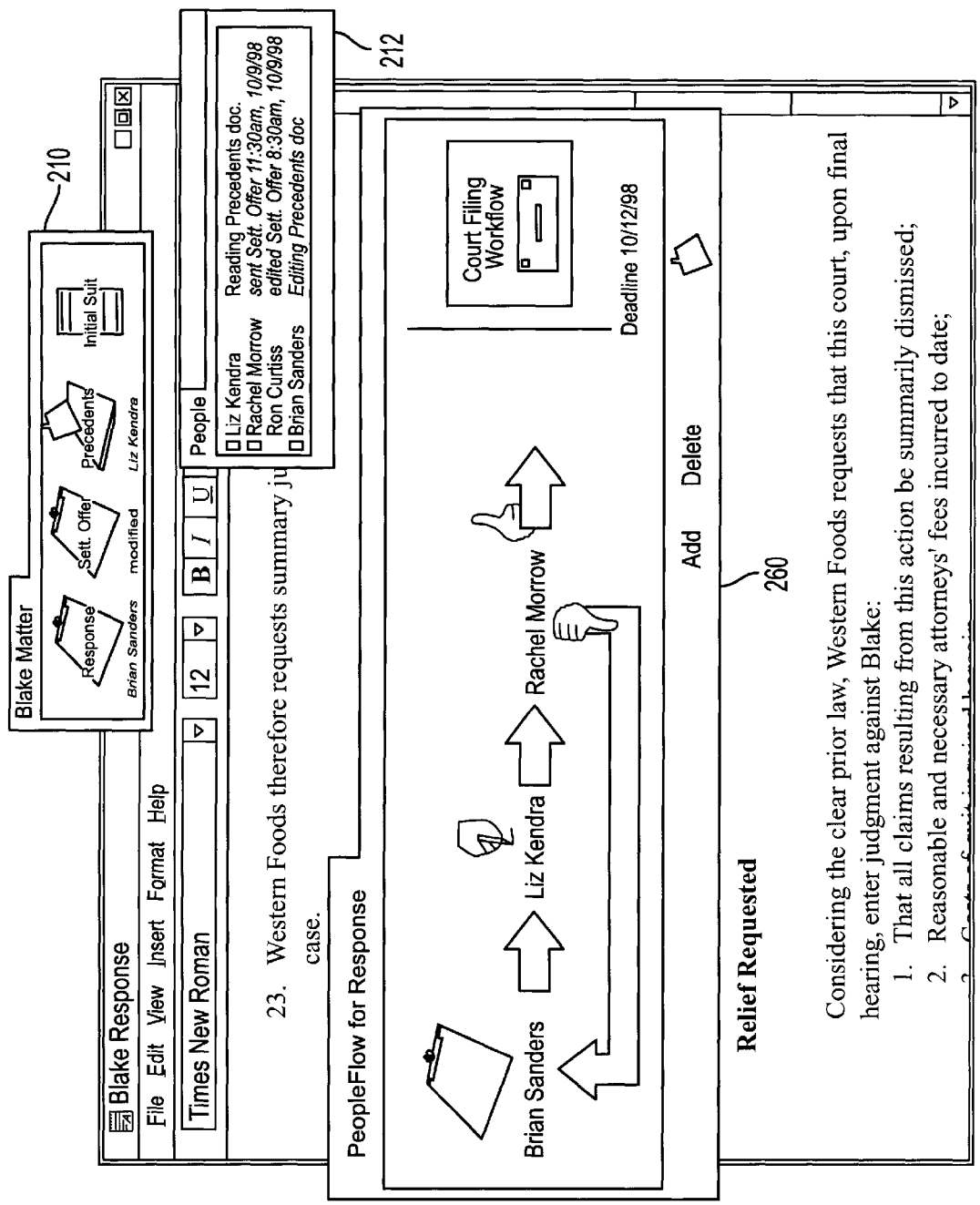
Figure 26:
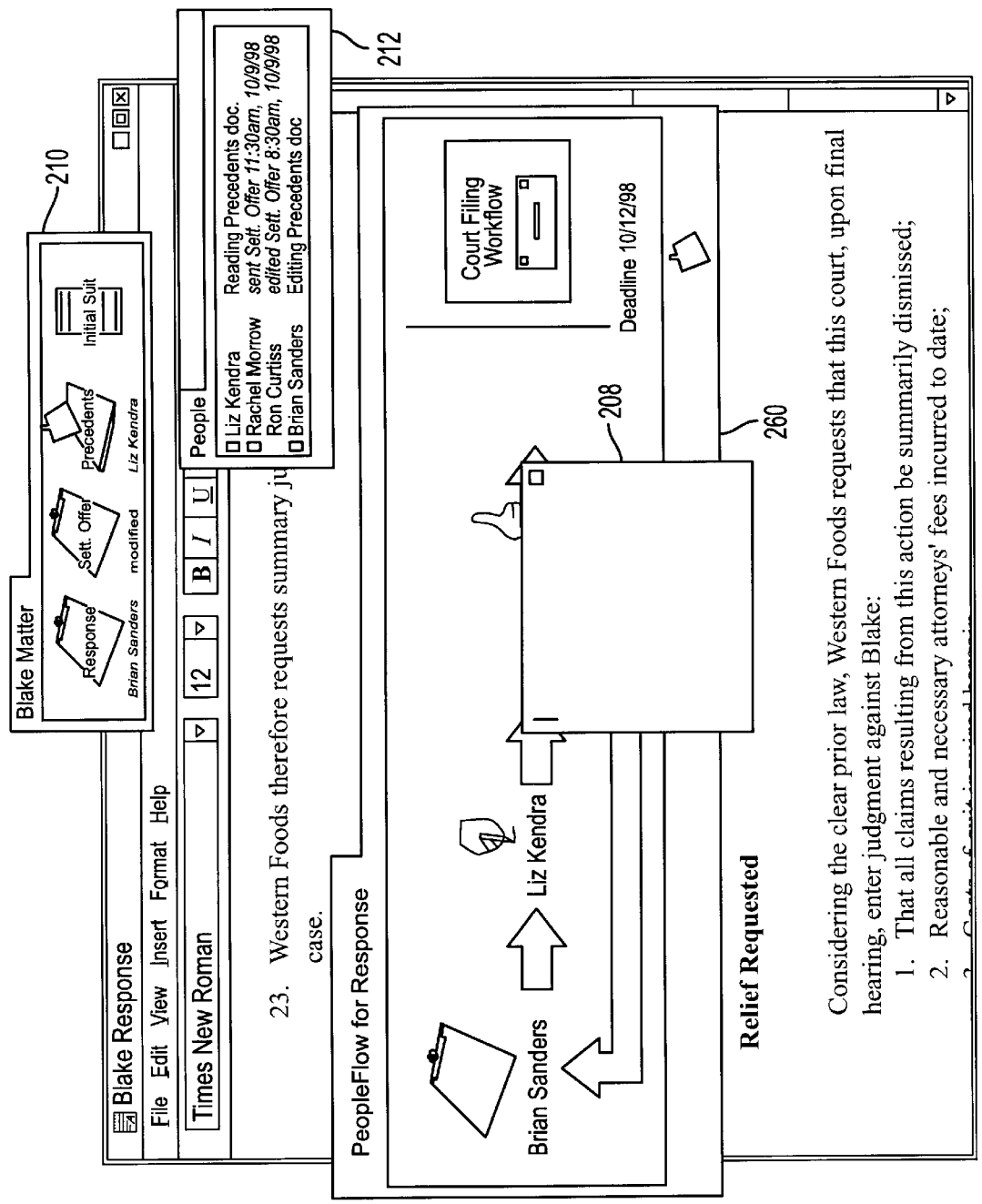
Figure 27:
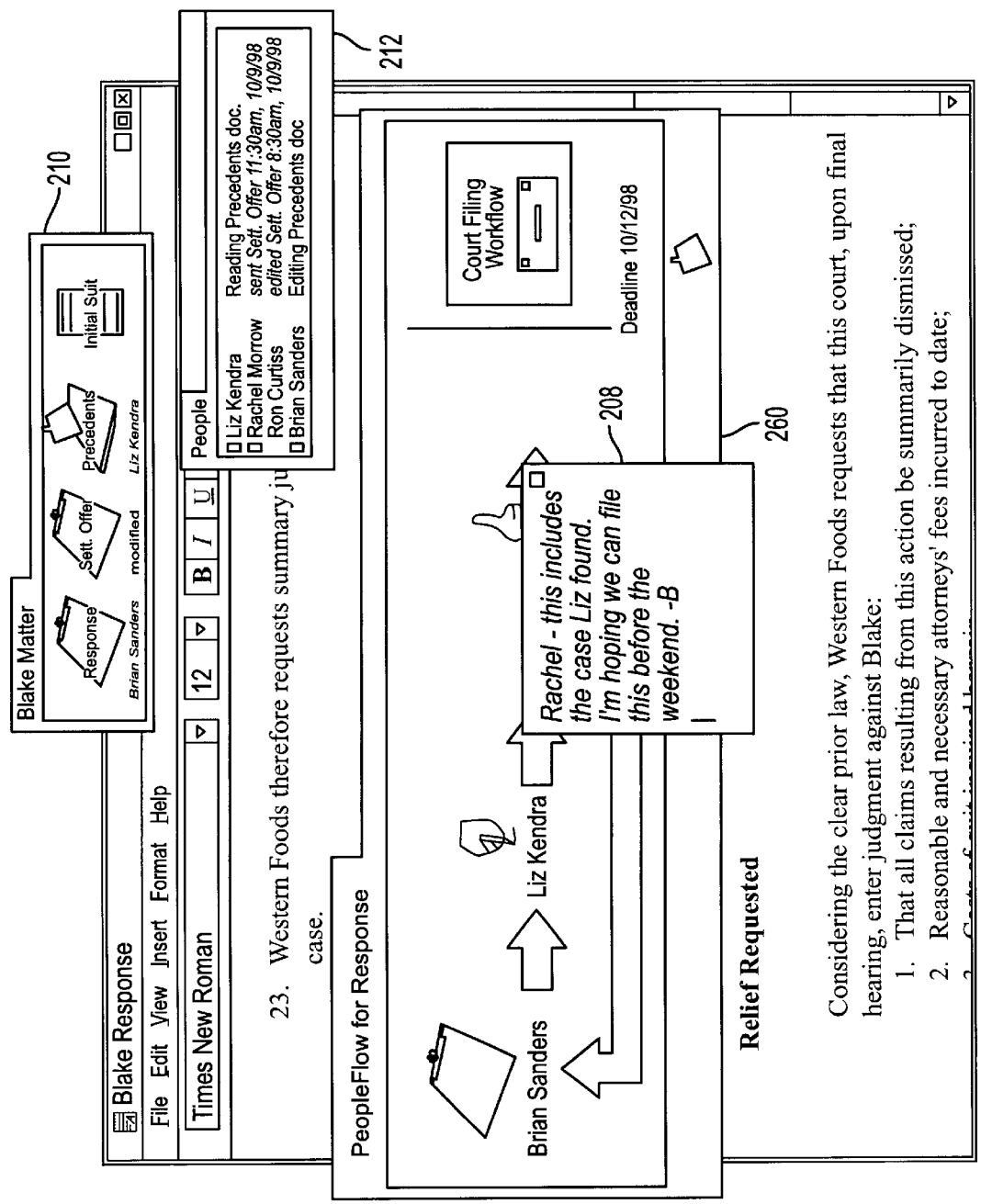

If the client brings up the document option menu UI 230 and selects the workflow option as shown in FIG. 23, step 158, a workflow tool generates a workflow window 260 (see FIG. 24), step 160, and allows the client to create and store a workflow for a selected document, step 162. Such a workflow is shown in the workflow window 260 in FIG. 25, and the workflow application integrates with the electronic note application to allow the client to generate notes to attach to any step in the workflow, as shown in FIGS. 26–27.

As a result, the present invention provides for a user- and document-centric view of a project, facilitates awareness of the people and documents involved in the project, and allows easy access to a host of collaboration tools through these unique views.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method implemented on a computer for improving awareness of a status of a task, the method comprising:

storing a first set of data representing a plurality of users involved in the task and a second set of data representing a plurality of data objects involved in the task;

receiving task-related data representing activities performed by each of the plurality of users involved in the task on the plurality of data objects involved in the task;

at a first time displaying in a first region of a screen display of the at least one of the users involved in the task a list of the plurality of users in association with an activity performed by each of the users at or most recently to the first time; and allowing each user to initiate through the list of users one or more first collaboration tools with one or more users selected by such user, the first collaboration tools being selected from a group consisting of a synchronous communication tool, an asynchronous communication tool, and a tool for simultaneous use of a data object;

at the first time displaying in a second region of the screen display of the at least one of the users a list of the plurality of data objects in association with an activity performed upon each of the plurality of data objects at or most recently to the first time; and allowing each user to initiate through the list of data objects one or more second collaboration tools relating to a data object selected by such user, the second collaboration tools being selected from the group consisting of a tool for viewing a history of activities relating to the selected data object, a tool for generating a work flow relating to the selected data object, and a tool for simultaneous use of a data object with one or more other users selected by such user.

2. The method of claim 1, comprising allowing the at least one user to select a first of the data objects from the lists of users or data objects and to manipulate the selected data object in an application program while displaying the lists of users and data objects.

3. The method of claim 1, comprising allowing at least one of the users to select the plurality of users involved in the task from among a larger group of users.

4. The method of claim 1, comprising allowing at least one of the users to select the plurality of data objects involved in the task from among a larger group of data objects.

5. The method of claim 1, wherein the step of receiving task-related data comprises receiving general activity data representing activities performed by a larger group of users upon a larger group of data objects, and selecting the task-related data from the general activity data using the first and second sets of data.

6. The method of claim 1, comprising allowing a first of the users to create an electronic note in relation to a first of the data objects, associating the electronic note to the first data object, and displaying a visual indicator of the electronic note associated with the first data object in the lists of users or data objects.

7. The method of claim 6, comprising allowing a second of the users to select the electronic note from the lists of users or data objects, and displaying the electronic note in response to the second user's selection thereof.

8. The method of claim 1, wherein the step of displaying the list of users comprises displaying a visual indicator for each of the users performing activities upon one of the data objects at the first time.

9. The method of claim 1, comprising storing a plurality of activities performed upon a first of the data objects in association with identifiers of the user or users who performed each of such activities, and displaying a list of the stored activities and associated user identifiers at the request of a first of the users.

10. The method of claim 9, comprising allowing the users to input data representing activities performed on the first data object, storing the input data, and displaying the input data in the list of stored activities.

11. The method of claim 9, comprising allowing the first user to select one of the activities in the list and displaying the data object as it existed following the selected activity.

12. The method of claim 1, comprising storing a plurality of activities performed by a first of the users in association with identifiers of the data object or objects upon which such activities were performed, and displaying a list of the stored activities and associated data object identifiers at the request of a first of the users.

13. The method of claim 1, comprising allowing a first user to select a second user from the displayed list of users and establishing communication between the first and second users.

14. The method of claim 1, comprising allowing a first user to select a second user from the displayed list of users, and allowing the first and second user to share a data object associated with the second user.

15. The method of claim 1, comprising allowing a first of the users to designate a work flow for a first of the data objects, the work flow comprising a set of the users ordered in a defined sequence to perform activities upon the data object.

16. The method of claim 1, wherein the step of displaying the list of users comprises displaying the list of users in a first window on the screen display and the step of displaying the list of data objects comprises displaying the list of data objects in a second window on the screen display.

17. A computer readable medium storing program code for, when executed on a computer, causing the computer to perform a method for improving awareness of a status of a task, the method comprising:

storing a first set of data representing a plurality of users involved in the task and a second set of data representing a plurality of data objects involved in the task;

receiving task-related data representing activities performed by each of the plurality of users involved in the task on the plurality of data objects involved in the task;

at a first time displaying in a first region of a screen display of at least one of the users involved in the task a list of the plurality of users in association with an activity performed by each of the users at or most recently to the first time;

allowing each user to initiate through the list of users one or more first collaboration tools with one or more users selected by such user, the first collaboration tools being selected from a group consisting of a synchronous communication tool, an asynchronous communication tool, and a tool for simultaneous use of a data object;

at the first time displaying in a second region of the screen display of the at least one of the users a list of the plurality of data objects in association with an activity performed upon each of the plurality of data objects at or most recently to the first time; and allowing each user to initiate through the list of data objects one or more second collaboration tools relating to a data object selected by such user, the second collaboration tools being selected from the group consisting of a tool for viewing a history of activities relating to the selected data object, a tool for generating a work flow relating to the selected data object, and a tool for simultaneous use of a data object with one or more other users selected by such user.

18. The computer readable medium of claim 17, wherein the method comprises allowing the at least one user to select a first of the data objects from the lists of users or data objects and to manipulate the selected data object in an application program while displaying the lists of users and data objects.

19. The computer readable medium of claim 17, wherein the method comprises allowing at least one of the users to select the plurality of users involved in the task from among a larger group of users.

20. The computer readable medium of claim 17, wherein the method comprises allowing at least one of the users to select the plurality of data objects involved in the task from among a larger group of data objects.

21. The computer readable medium of claim 17, wherein the step of receiving task-related data comprises receiving general activity data representing activities performed by a larger group of users upon a larger group of data objects, and selecting the task-related data from the general activity data using the first and second sets of data.

22. The computer readable medium of claim 17, wherein the method comprises allowing a first of the users to create an electronic note in relation to a first of the data objects, associating the electronic note to the first data object, and displaying a visual indicator of the electronic note associated with the first data object in the lists of users or data objects.

23. The computer readable medium of claim 22, wherein the method comprises allowing a second of the users to select the electronic note from the lists of users or data objects, and displaying the electronic note in response to the second user's selection thereof.

24. The computer readable medium of claim 17, wherein the step of displaying the list of users comprises displaying a visual indicator for each of the users performing activities upon one of the data objects at the first time.

25. The computer readable medium of claim 17, wherein the method comprises storing a plurality of activities performed upon a first of the data objects in association with identifiers of the user or users who performed each of such activities, and displaying a list of the stored activities and associated user identifiers at the request of a first of the users.

26. The computer readable medium of claim 25, comprising allowing the users to input data representing activities performed on the first data object, storing the input data, and displaying the input data in the list of stored activities.

27. The computer readable medium of claim 25, wherein the method comprises allowing the first user to select one of the activities in the list and displaying the data object as it existed following the selected activity.

28. The computer readable medium of claim 17, wherein the method comprises storing a plurality of activities performed by a first of the users in association with identifiers of the data object or objects upon which such activities were performed, and displaying a list of the stored activities and associated data object identifiers at the request of a first of the users.

29. The computer readable medium of claim 17, wherein the method comprises allowing a first user to select a second user from the displayed list of users and establishing communication between the first and second users.

30. The computer readable medium of claim 17, wherein the method comprises allowing a first user to select a second user from the displayed list of users, and allowing the first and second user to share a data object associated with the second user.

31. The computer readable medium of claim 17, wherein the method comprises allowing a first of the users to designate a work flow for a first of the data objects, the work flow comprising a set of the users ordered in a defined sequence to perform activities upon the data object.

32. The computer readable medium of claim 17, wherein the step of displaying the list of users comprises displaying the list of users in a first window on the screen display and the step of displaying the list of data objects comprises displaying the list of data objects in a second window on the screen display.

33. A computer readable medium storing program code for, when executed on a computer, causing the computer to improve awareness and collaboration among a selected set of users involved in a project, the project involving a selected set of documents, the method comprising:

receiving data representing activities performed by the users on the plurality of documents;

at a first time displaying in a first region of a screen display of the computer a list of the users in association with an activity performed by each of the users at or most recently to the first time;

allowing each user to initiate through the list of users one or more first collaboration tools with one or more users selected by such user, the first collaboration tools being selected from a group consisting of a synchronous communication tool, an asynchronous communication tool, and a tool for simultaneously use of a document;

at the first time displaying in a second region of the screen display a list of the documents in association with an activity performed upon each of the plurality documents at or most recently to the first time; and allowing each user to initiate through the list of documents one or more second collaboration tools relating to a document selected by such user, the second collaboration tools being selected from a group consisting of a tool for viewing a history of activities relating to the selected document, a tool for generating a work flow relating to the selected document, and a tool for simultaneously use of a document with one or more other users selected by such user.

* * * * *